US 11,404,938 B2

(12) United States Patent
Osada et al.

(10) Patent No.: US 11,404,938 B2
(45) Date of Patent: Aug. 2, 2022

(54) ANGLE DETECTION APPARATUS, ROTATION AMOUNT SPECIFICATION UNIT, AND ROTARY DRIVING UNIT

(71) Applicant: MINEBEA MITSUMI Inc., Nagano (JP)

(72) Inventors: Yasuo Osada, Kawaguchi (JP); Hiroyuki Hishiyama, Hachioji (JP)

(73) Assignee: MINEBEA MITSUMI Inc., Nagano (JP)

( * ) Notice: Subject to any disclaimer, the term of this patent is extended or adjusted under 35 U.S.C. 154(b) by 233 days.

(21) Appl. No.: 16/647,562

(22) PCT Filed: Sep. 18, 2018

(86) PCT No.: PCT/JP2018/034441
§ 371 (c)(1),
(2) Date: Mar. 16, 2020

(87) PCT Pub. No.: WO2019/059173
PCT Pub. Date: Mar. 28, 2019

(65) Prior Publication Data
US 2020/0280245 A1     Sep. 3, 2020

(30) Foreign Application Priority Data

Sep. 19, 2017   (JP) .............................. JP2017-179350

(51) Int. Cl.
*H02K 11/215*   (2016.01)
*H02K 7/116*    (2006.01)

(52) U.S. Cl.
CPC ........... *H02K 11/215* (2016.01); *H02K 7/116* (2013.01)

(58) Field of Classification Search
CPC .. H02K 11/215; H02K 7/116; G01D 2205/26; G01D 2205/28; G01D 5/145; G06M 1/102; H02P 6/17
(Continued)

(56) References Cited

U.S. PATENT DOCUMENTS 6,630,823 B2    10/2003   Tateishi et al.
2004/0256545 A1*  12/2004  Stobbe .................. G01D 5/04
                                                    250/231.13
(Continued)

FOREIGN PATENT DOCUMENTS

CN          1504725 A       6/2004
EP        2 944 924 A1     11/2015
(Continued)

OTHER PUBLICATIONS

International Search Report for corresponding International Application No. PCT/JP2018/034441 dated Dec. 11, 2018.
(Continued)

*Primary Examiner* — John K Kim
(74) *Attorney, Agent, or Firm* — Pearne & Gordon LLP

(57) ABSTRACT

Provided is an angle detection apparatus making it possible to reduce the labor of manufacturing while also suppressing bulkiness.
The angle detection apparatus includes a first rotating body (120), a second rotating body (122), a first transmission mechanism (111) that causes the second rotating body (122) to rotate by reducing a speed of a rotation of the first rotating body (120), a first angle detector (Ds) that detects a rotational angle of the first rotating body (120), another second angle detector (Dm) that detects a rotational angle of the second rotating body (122), and a processor (40) that specifies a number of revolutions (Rs) of the first rotating body (120). The processor (40) specifies the number of revolu-
(Continued)

tions (Rs) while dynamically varying a specification condition for specifying the number of revolutions (Rs) according to a numerical value decided according to the detected rotational angle of the first rotating body (120) and a reduction ratio (G1) of the first transmission mechanism (111), and the detected rotational angle of the second rotating body (122).

5 Claims, 14 Drawing Sheets

(58) Field of Classification Search
USPC .................................................... 310/68 B
See application file for complete search history.

(56) References Cited

U.S. PATENT DOCUMENTS

| 2007/0152856 | A1  | 7/2007  | Yamamoto |           |
|--------------|-----|---------|----------|-----------|
| 2015/0108878 | A1* | 4/2015  | Rodger   | H02K 7/116 |
|              |     |         |          | 310/68 B  |
| 2015/0369636 | A1  | 12/2015 | Deak et al. | |
| 2016/0365771 | A1* | 12/2016 | Kokubo   | B25J 9/1641 |
| 2017/0194841 | A1  | 7/2017  | Raju     |           |
| 2019/0052786 | A1* | 2/2019  | Suto     | H02K 11/215 |
| 2020/0132507 | A1  | 4/2020  | Osada    |           |
| 2020/0280245 | A1* | 9/2020  | Osada    | H02K 7/116 |

FOREIGN PATENT DOCUMENTS

| EP | 3 650 815 A1 | 5/2020 |
| JP | 2004-077483 A | 3/2004 |
| JP | 2006-029937 A | 2/2006 |
| JP | 2007-155627 A | 6/2007 |
| JP | 2009-121958 A | 6/2009 |
| JP | 2012-065505 A | 3/2012 |
| JP | 2012-141217 A | 7/2012 |
| JP | 2016-024025 A | 2/2016 |

OTHER PUBLICATIONS

Written Opinion for corresponding International Application No. PCT/JP2018/034441 dated Dec. 11, 2018.
Japanese Office Action dated Apr. 6, 2021 for corresponding Japanese Application No. 2017-179350 and English translation.
First Office Action dated Apr. 30, 2021 for corresponding Chinese Application No. 201880060660.5 and English translation.
Extended European Search Report dated May 6, 2021 for corresponding European Application No. 18857479.2.
International Preliminary Report on Patentability for corresponding International Application No. PCT/JP2018/034441 dated Mar. 24, 2020.
English translation for the Written Opinion for corresponding International Application No. PCT/JP2018/034441 dated Dec. 11, 2018.

* cited by examiner

| LOOP COUNTER VALUE | SPECIFICATION CONDITION | | DETERMINATION RESULT | | |
|---|---|---|---|---|---|
| | LOWER LIMIT VALUE | UPPER LIMIT VALUE | LOWER LIMIT DETERMINATION | UPPER LIMIT DETERMINATION | OVERALL DETERMINATION |
| 0 | 0.00 | 6.00 | ○ | × | |
| 1 | 6.00 | 12.00 | ○ | × | |
| 2 | 12.00 | 18.00 | ○ | ○ | ○ |
| 3 | 18.00 | 24.00 | × | ○ | |
| 4 | 24.00 | 30.00 | × | ○ | |
| 5 | 30.00 | 36.00 | × | ○ | |
| 6 | 36.00 | 42.00 | × | ○ | |
| 7 | 42.00 | 48.00 | × | ○ | |
| 8 | 48.00 | 54.00 | × | ○ | |
| 9 | 54.00 | 60.00 | × | ○ | |

FIG.3

| LOOP COUNTER VALUE | SPECIFICATION CONDITION | | DETERMINATION RESULT | | |
|---|---|---|---|---|---|
| | LOWER LIMIT VALUE | UPPER LIMIT VALUE | LOWER LIMIT DETERMINATION | UPPER LIMIT DETERMINATION | OVERALL DETERMINATION |
| 0 | 0.02 | 6.02 | ○ | × | |
| 1 | 6.02 | 12.02 | ○ | ○ | ○ |
| 2 | 12.02 | 18.02 | × | ○ | |
| 3 | 18.02 | 24.02 | × | ○ | |
| 4 | 24.02 | 30.02 | × | ○ | |
| 5 | 30.02 | 36.02 | × | ○ | |
| 6 | 36.02 | 42.02 | × | ○ | |
| 7 | 42.02 | 48.02 | × | ○ | |
| 8 | 48.02 | 54.02 | × | ○ | |
| 9 | 54.02 | 60.02 | × | ○ | |

FIG.4

ANGLE DETECTION APPARATUS, ROTATION AMOUNT SPECIFICATION UNIT, AND ROTARY DRIVING UNIT

TECHNICAL FIELD

The present invention relates to an angle detection apparatus, a rotation amount specification unit, and a rotary driving unit for specifying a rotation amount of a rotating body.

BACKGROUND ART

In various control machinery of the related art, rotary encoders used to detect the position and angle of a movable element are known. Such encoders include incremental encoders that detect a relative position or angle, and absolute encoders that detect an absolute position or angle. For example, Patent Literature 1 describes a rotational angle detection apparatus provided with a first gear fitted to a rotary shaft, and an absolute rotational angle detector that detects an absolute rotational angle of second and third gears that engage with the first gear, in which an absolute rotational angle of the rotary shaft is detected on the basis of the detected absolute rotational angle.

The rotational angle detection apparatus described in Patent Literature 1 is configured such that the difference between the absolute rotational angle of the rotary shaft to be detected that is actually rotated and a computed absolute rotational angle is stored in non-volatile memory as a correction angle, and during use, the computed absolute rotational angle of the rotary shaft to be detected is corrected by the correction angle stored in the non-volatile memory. However, because the correction angle is different for each individual apparatus, there is a problem with the rotational angle detection apparatus. Namely, the rotary shaft subject to inspection in each individual apparatus is actually rotated to measure and store the correction angle in the non-volatile memory, and therefore manufacturing is labor-intensive.

DOCUMENT LIST

Patent Literature

Patent Literature 1: Japanese Patent Application Publication No. 2006-029937

SUMMARY OF INVENTION

Technical Problem

The inventors have recognized the following regarding a rotation amount acquisition apparatus that includes a transmission mechanism and specifies a rotation amount over multiple revolutions of a predetermined rotating body on the basis of the rotational angles of a plurality of rotating bodies that rotate at successively reduced speeds.

In some cases, the manufacturing process of the rotation amount acquisition apparatus includes the work of aligning the rotational position of each rotating body in a predetermined relationship. For example, it is conceivable to align the rotational position of each rotating body such that when one rotating body is in a certain rotational position, another rotating body is positioned in a predetermined rotational position. It is desirable to perform the work carefully to precisely align the rotational position of each rotating body, and accordingly, there is a possibility that manufacturing will too labor-intensive. Particularly, a configuration that includes a transmission mechanism such as gears that transmit rotation may be affected by mechanical error such as hysteresis error due to backlash of the gears, and the alignment work for each rotating body may become even more labor-intensive.

Also, in the rotation amount acquisition apparatus, it is desirable to have a wide range of specifiable rotation amounts, and therefore it is conceivable to increase the reduction ratio between the rotating bodies. However, if the reduction ratio is increased, the transmission mechanism conceivably becomes bulkier, while in addition, the labor of aligning each rotating body increases even more.

Given the above, the inventors have recognized problems with the rotation amount acquisition apparatus that should be improved from the perspective of reducing the labor of manufacturing while also suppressing bulkiness.

The present invention has been devised in light of such problems, and an object of the present invention is to provide an angle detection apparatus making it possible to reduce the labor of manufacturing while also suppressing bulkiness.

Solution to Problem

To solve the above problems, an angle detection apparatus according to one aspect of the present invention is provided with a rotating body, another rotating body, a transmission mechanism that causes the other rotating body to rotate by reducing a speed of a rotation of the rotating body, an angle detector that detects a rotational angle of the rotating body, another angle detector that detects a rotational angle of the other rotating body, and a processor that specifies a number of revolutions of the rotating body. The processor specifies the number of revolutions while dynamically varying a specification condition for specifying the number of revolutions according to a numerical value decided according to the detected rotational angle of the rotating body and a reduction ratio of the transmission mechanism, and the detected rotational angle of the other rotating body.

According to the aspect, in the angle detection apparatus that includes the transmission mechanism, the processor can specify a number of revolutions of the rotating body while dynamically varying the specification condition.

Another aspect of the present invention is a rotation amount specification unit. The rotation amount specification unit is provided with the angle detection apparatus described above, a rotation detection apparatus that outputs a pulse sequence having a number of pulses corresponding to a rotation amount of the rotating body, and a rotation amount specification apparatus that specifies an absolute rotation amount of the rotating body. The angle detection apparatus specifies the rotation amount of the rotating body according to the specified number of revolutions, the detected rotational angle of the rotating body, and the detected rotational angle of the other rotating body, and the rotation amount specification apparatus acquires and stores the rotation amount of the rotating body specified by the angle detection apparatus as a stored rotation amount, and specifies the absolute rotation amount according to the stored rotation amount and a numerical value obtained by counting the number of pulses in the pulse sequence.

Yet another aspect of the present invention is a rotary driving unit. The rotary driving unit is provided with the rotation amount specification apparatus described above, and a hybrid stepping motor that includes a main shaft and rotationally drives the main shaft. The rotating body is configured to rotate as one with the main shaft.

It should be noted that any combination of the above components, and any replacement of the components and expressions of the present invention with a method, an apparatus, a system, or the like are also valid as aspects of the present invention.

Effects of Invention

According to the present invention, an angle detection apparatus making it possible to reduce the labor of manufacturing while also suppressing bulkiness can be provided.

BRIEF DESCRIPTION OF DRAWINGS

FIG. 3 A table illustrating an example of a loop counter value, a specification condition, and a determination result in the angle detection apparatus of FIG. 1.

FIG. 4 A table illustrating another example of a loop counter value, a specification condition, and a determination result in the angle detection apparatus of FIG. 1.

DESCRIPTION OF EMBODIMENTS

Figure 1:
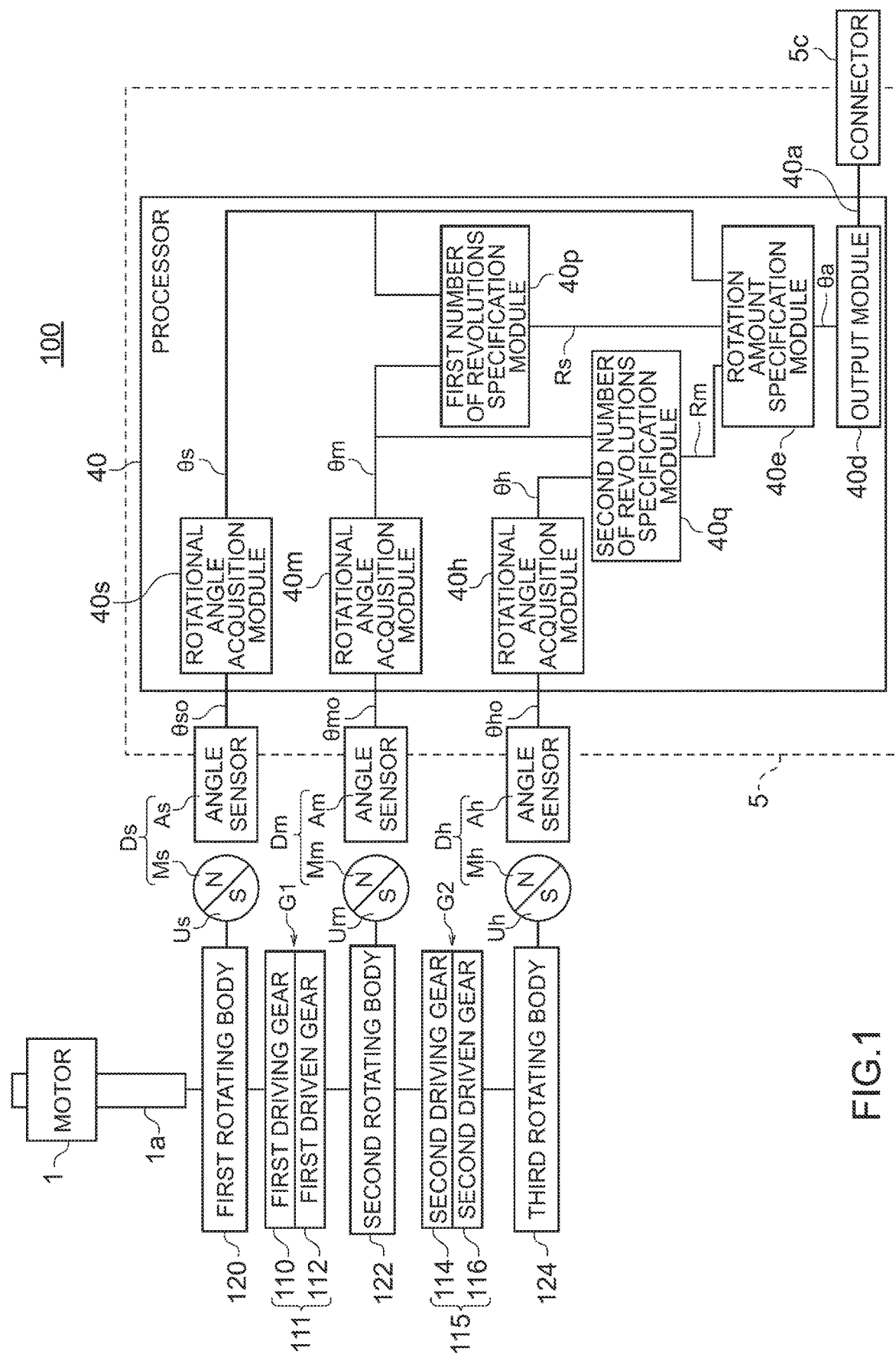
FIG. 1 A block diagram illustrating an example of a configuration of an angle detection apparatus according to a first embodiment of the present invention.

The inventors researched a rotation amount acquisition apparatus provided with a first rotating body and one or more second rotating bodies that rotate at a reduced speed as the first rotating body rotates, in which the respective rotational angles of the first rotating body and the one or more second rotating bodies are detected by a rotational angle detector, and a rotation amount over multiple revolutions of the first rotating body is acquired on the basis of the detection results. Through the process of this research, the inventors obtained findings like the following.

As an example, consider a rotation amount acquisition apparatus provided with a first rotating body and a second rotating body that rotates at a speed reduced by a reduction ratio G (for example, 1/60) with respect to the rotation of the first rotating body, in which a rotational angle θso of the first rotating body and a rotational angle θmo of the second rotating body are detected by a rotational angle detector, and a rotation amount θa over multiple revolutions of the first rotating body is acquired on the basis of θso and θmo. In this case, the detected rotational angles θso and θmo are acquired as rotational angles θs and θm which are processable as numerical values. By specifying a number of revolutions Rs of the first rotating body from the acquired rotational angle θm, the rotation amount θa of the first rotating body can be computed according to Formula 1.

Rotation amount θa of first rotating body=360×number of revolutions Rs of first rotating body+ rotational angle θs of first rotating body (°)     (Formula 1)

Letting G be the reduction ratio, the number of revolutions Rs of the first rotating body can be specified in a range of from 0 to (1/G−1) revolutions in correspondence with a rotation of 360° or less by the second rotating body. In the example where the reduction ratio G is 1/60, the number of revolutions Rs of the first rotating body can be specified in a range from 0 to 59 revolutions of the first rotating body from the angle of the second rotating body. In other words, because the second rotating body rotates 360°×reduction ratio G=360°/60=6° every time the first rotating body completes a single revolution, when the first rotating body rotates Rs, the second rotating body rotates Rs×360°/60=Rs×6°. Hereinafter, (360°×reduction ratio G) is referred to as the unit shift quantity.

In other words, the number of revolutions Rs of the first rotating body can be specified as the integer value obtained by rounding down the result of dividing θm by the unit shift quantity. In this example, the number of revolutions Rs of the first rotating body can be specified as 0 revolutions when θm is in the range from 0° or greater to less than 6°, 1 revolution when θm is in the range from 6° or greater to less than 12°, and 2 revolutions when θm is in the range from 12° or greater to less than 18°. That is, boundary values in 6° steps (0°, 6°, 12°, 18°, . . . , 354°) exist for the rotational angle θm. In other words, the number of revolutions Rs of the first rotating body can be thought of as the integer obtained by counting up the boundary values for every unit shift quantity of the rotational angle θm.

As an example herein, in the case where the rotational angle θm is 12° (one of the boundary values), if there is slight error or fluctuation in the detected value or the threshold value, the specification result for the number of revolutions Rs of the first rotating body may fluctuate between 1 revolution and 2 revolutions, and a large difference in the rotation amount θa of the first rotating body conceivably could be produced. Such a problem may also occur for angles near each of the boundary values other than 12°.

Accordingly, in the process of specifying the number of revolutions Rs of the first rotating body from the rotational angle θm, the inventors have devised a method of varying the condition of the specification according to the rotational angle θs. In other words, in the case where the rotational angle θm is near a boundary value, and there is a possibility that the number of revolutions Rs of the first rotating body specified from the rotational angle θm will vary between n before counting and n+1 after counting, n and n+1 can be selected depending on the magnitude of the rotational angle θs. For example, consider the case where the rotational angle θs is within ±60° of 0° (360°). In the case where the rotational angle θs is 300° and therefore positioned just before the boundary, the probability that the number of revolutions Rs is n before counting may be said to be high, whereas in the case where the rotational angle θs is 60° and therefore positioned just after the boundary, the probability that the number of revolutions Rs is n+1 after counting may be said to be high.

Specifically, a lower limit value and an upper limit value are set according to the rotational angle θs, and it is determined whether or not the rotational angle θm satisfies a condition of being the lower limit value or greater and also less than the upper limit value (hereinafter referred to as the specification condition). Also, a specification condition can be set for each number of revolutions Rs, and in the case where the rotational angle θm satisfies one of the specification conditions, the number of revolutions Rs corresponding to that specification condition can be set as the number of revolutions Rs of the first rotating body. In other words, by using a specification condition that is not fixed but instead is varied by the unit shift quantity at a time, and specifying the number of revolutions Rs of the first rotating body from the rotational angle θm, error in the specified number of revolutions Rs can be suppressed, and by extension, the detection error of the rotation amount θa of the first rotating body can be reduced.

In this way, the method of specifying the number of revolutions Rs of the first rotating body from the rotational angle θm according to the rotational angle θs and the unit shift quantity can be achieved by various algorithms. As a first algorithm, it is conceivable to calculate the relationship of the number of revolutions Rs with respect to the rotational angle θs and the rotational angle θm in advance to create and store a relationship table in memory, and specify the number of revolutions Rs of the first rotating body by a table process that treats the rotational angle θs and the rotational angle θm as keys. This case is preferable due to having few processing steps and a fast specification speed.

Furthermore, the inventions have researched into reducing the amount of memory used in processing, and have devised a second algorithm. The second algorithm specifies the number of revolutions Rs while dynamically varying the specification condition for specifying the number of revolutions Rs according to a lower limit value and an upper limit value which are numerical values decided according to the rotational angle θs and the reduction ratio G, and the rotational angle θm. The algorithm may include a first process of dynamically varying the specification condition and a second process of specifying the number of revolutions Rs that satisfies the varied specification condition.

For example, the first process may include a shift process of shifting the specification condition by the unit shift quantity at a time, a determination process of determining whether or not the rotational angle θm satisfies the changed specification condition that has been shifted by the shift process, and an update process of repeating the shift process and the determination process while also updating a loop counter value until an exit condition is satisfied. In this process, an initial specification condition (for example, 0° or greater and less than 6°) may be decided from the reduction ratio G and the rotational angle θs, and the changed specification condition may be acquired by successively varying the specification condition by the unit shift quantity at a time through the loop process. For example, the changed specification condition may be obtained by shifting the initial specification condition by the numerical value obtained by multiplying the unit shift quantity by the loop counter value. In this process, the loop counter value may also be successively varied from the lower limit (0 revolutions) to the upper limit (1/G revolutions, such as 60 revolutions for example) of the number of revolutions Rs.

For example, the second process may also include a process of specifying the number of revolutions Rs according to the loop counter value when the rotational angle θm satisfies the changed specification condition that has been shifted by the shift process. This algorithm can reduce the amount of memory used in processing compared to the first algorithm.

These configurations and algorithms can also be applied similarly to a case of additionally detecting the rotational angle of a third rotating body that rotates at a reduced speed with respect to the second rotating body, and specifying the number of revolutions of the second rotating body on the basis of the detection result. The embodiments have been devised on the basis of the above findings and thinking, and specific configurations of the embodiments are described hereinafter.

Hereinafter, preferred embodiments of the present invention will be described with reference to the drawings. In each embodiment and variant, the same or similar components and members are denoted with the same signs, and duplicate description is omitted as appropriate. Also, the illustrated dimensions of members in the drawings have been enlarged or reduced as appropriate for easier understanding. Also, in the drawings, some members which are not important for explaining the embodiments have been omitted from illustration.

Moreover, terms including ordinals such as a first and second are used to describe various components, but these terms are used only for the purpose of distinguishing one component from another component, and the components are not limited by such terms.

First Embodiment

A first embodiment of the present invention will be described with reference to the drawings. FIG. 1 is a block diagram illustrating an example of a configuration of an angle detection apparatus 100 according to a first embodiment of the present invention. The angle detection apparatus 100 is an absolute encoder that specifies a rotation amount and an angle over multiple revolutions of a first rotating body 120. The angle detection apparatus 100 includes the first rotating body 120, a first transmission mechanism 111, a second rotating body 122, a second transmission mechanism 115, a third rotating body 124, a first angle detector Ds, a second angle detector Dm, a third angle detector Dh, and a processor 40. In the first embodiment, the first rotating body 120, the second rotating body 122, and the third rotating body 124 are designated the rotating bodies when being referred to collectively. The first rotating body 120 is a rotating body that is coupled to a main shaft 1a of a motor 1, and rotates at the same speed as the main shaft 1a.

The first transmission mechanism 111 is a rotation transmission mechanism that reduces the rotation of the first rotating body 120 by a first reduction ratio G1, and transmits the reduced rotation to the second rotating body 122. The first transmission mechanism 111 can use a reduction mechanism based on known principles. In the example of FIG. 1, the first transmission mechanism 111 includes a first driving gear 110 and a first driven gear 112. The first driving gear 110 and the first driven gear 112 may be spur gears, for example.

The first driving gear 110 is coupled to the first rotating body 120 and rotates at the same speed as the first rotating body 120. The first driven gear 112 engages with the first driving gear 110 and rotates at a speed reduced by the first reduction ratio G1 in accordance with the rotation of the first driving gear 110. The second rotating body 122 is coupled to the first driven gear 112 and rotates at the same speed as the first driven gear 112. Consequently, the second rotating body 122 rotates at a speed reduced by the first reduction ratio G1 with respect to the first rotating body 120. In the example of FIG. 1, the first reduction ratio G1 is set to 1/60.

The second transmission mechanism 115 is a rotation transmission mechanism that reduces the rotation of the second rotating body 122 by a second reduction ratio G2, and transmits the reduced rotation to the third rotating body 124. The second transmission mechanism 115 can use a reduction mechanism based on known principles. In the example of FIG. 1, the second transmission mechanism 115 includes a second driving gear 114 and a second driven gear 116. The second driving gear 114 and the second driven gear 116 may be spur gears, for example.

The second driven gear 116 engages with the second driving gear 114 and rotates at a speed reduced by the second reduction ratio G2 in accordance with the rotation of the second driving gear 114. The third rotating body 124 is coupled to the second driven gear 116 and rotates at the same speed as the second driven gear 116. Consequently, the third rotating body 124 rotates at a speed reduced by the second reduction ratio G2 with respect to the second rotating body 122. In the example of FIG. 1, the second reduction ratio G2 is set to 1/12. The third rotating body 124 rotates at a speed reduced by the product of the first reduction ratio G1 and the second reduction ratio G2, namely a reduction ratio G12 (1/720) with respect to the first rotating body 120.

The first angle detector Ds is an angle detection element that detects a rotational angle θso of the first rotating body 120. The second angle detector Dm is an angle detection element that detects a rotational angle θmo of the second rotating body 122. The third angle detector Dh is an angle detection element that detects a rotational angle θho of the third rotating body 124. The first angle detector Ds, the second angle detector Dm, and the third angle detector Dh are designated the angle detectors when being referred to collectively. The angle detectors can use an angle detection element based on known principles.

As illustrated in FIG. 1, the first angle detector Ds includes a magnet Ms and an angle sensor As. The magnet Ms is affixed to an end face of the first rotating body 120. On the end face of the magnet Ms toward the angle sensor As, a magnetic dipole Us is provided in the direction perpendicular to the rotational axis line of the first rotating body 120. The end face provided with the dipole Us is referred to as the dipole face.

The angle sensor As detects the rotational angle of the first rotating body 120. The angle sensor As is provided such that a detecting face of the angle sensor As opposes the dipole face of the magnet Ms in the thrust direction across a gap. In the example of FIG. 1, the angle sensor As is affixed to a substrate 5, which is a stationary body. The angle sensor As detects the dipole Us of the magnet Ms, and outputs the rotational angle θso as a detection result to the processor 40. In other words, the angle sensor As outputs the rotational angle θso of the first rotating body 120 to the processor 40. In the example of FIG. 1, the angle sensor As outputs the rotational angle θso as a digital signal. The rotational angle θso is not limited to a digital signal, and may also be an analog signal.

As illustrated in FIG. 1, the second angle detector Dm includes a magnet Mm and an angle sensor Am. The magnet Mm is affixed to an end face of the second rotating body 122. On the end face of the magnet Mm toward the angle sensor Am, a magnetic dipole Um is provided in the direction perpendicular to the rotational axis line of the second rotating body 122. The end face provided with the dipole Um is referred to as the dipole face.

The angle sensor Am detects the rotational angle of the second rotating body 122. The angle sensor Am is provided such that a detecting face of the angle sensor Am opposes the dipole face of the magnet Mm in the thrust direction across a gap. In the example of FIG. 1, the angle sensor Am is affixed to the substrate 5, which is a stationary body. The angle sensor Am detects the dipole Um of the magnet Mm, and outputs the rotational angle θmo as a detection result to the processor 40. In other words, the angle sensor Am outputs the rotational angle θmo of the second rotating body 122 to the processor 40. In the example of FIG. 1, the angle sensor Am outputs the rotational angle θmo as a digital signal. The rotational angle θmo is not limited to a digital signal, and may also be an analog signal.

As illustrated in FIG. 1, the third angle detector Dh includes a magnet Mh and an angle sensor Ah. The magnet Mh is affixed to an end face of the third rotating body 124. On the end face of the magnet Mh toward the angle sensor Ah, a magnetic dipole Uh is provided in the direction perpendicular to the rotational axis line of the third rotating body 124. The end face provided with the dipole Uh is referred to as the dipole face.

The angle sensor Ah detects the rotational angle of the third rotating body 124. The angle sensor Ah is provided such that a detecting face of the angle sensor Ah opposes the dipole face of the magnet Mh in the thrust direction across a gap. In the example of FIG. 1, the angle sensor Ah is affixed to the substrate 5, which is a stationary body. The angle sensor Ah detects the dipole Uh of the magnet Mh, and outputs the rotational angle θho as a detection result to the processor 40. In other words, the angle sensor Ah outputs the rotational angle θho of the third rotating body 124 to the processor 40. In the example of FIG. 1, the angle sensor Ah outputs the rotational angle θho as a digital signal. The rotational angle θho is not limited to a digital signal, and may also be an analog signal.

(Angle Sensors)

In the first embodiment, the angle sensors As, Am, and Ah are designated the angle sensors when being referred to collectively. The angle sensors are sensors that detect an absolute rotational angle in the range from 0° to 360° corresponding to one revolution of the rotating bodies. The angle sensors output the detected rotational angles θso, θmo, and θho to the processor 40. The processor 40 acquires the rotational angles θso, θmo, and θho as rotational angles θs, θm, and θh which are processable as numerical values by rotational angle acquisition modules 40$s$, 40$m$, and 40$h$ described later. The angle sensors may also be magnetic angle sensors having relatively high resolution. As an example, a magnetic angle sensor includes a detection element that detects a magnetic pole and an arithmetic circuit that outputs a digital signal on the basis of the output from the detection element. The detection element may include a plurality (for example, four) magnetic field detection elements such as Hall effect elements or giant magnetoresistive (GMR) elements, for example. The angle sensors may be configured such that when the electrical power is stopped temporarily and then resumed, the same rotational angle as before the power interruption is output. Additionally, the angle sensors may be configured such that when power is interrupted, the correct current position is output even if the main shaft is rotated by an external force.

The processor 40 will be described. The blocks of the processor 40 illustrated in FIG. 1 can be realized in hardware by elements such as a central processing unit (CPU) of a computer or a machine, and realized in software by a computer program or the like, but herein, function blocks achieved by the cooperation of hardware and software are illustrated. Consequently, it should be understood to persons skilled in the art related to this specification that these function blocks can be achieved in a variety of ways through the combination of hardware and software.

The processor 40 is affixed to the substrate 5 by soldering. The processor 40 includes rotational angle acquisition modules 40s, 40m, and 40h, a first number of revolutions specification module 40p, a second number of revolutions specification module 40q, a rotation amount specification module 40e, and an output module 40d. The rotational angle acquisition modules 40s, 40m, and 40h acquire the detection results from the angle sensors As, Am, and Ah, namely the rotational angles θso, θmo, and θho of the rotating bodies, as the rotational angles θs, θm, and θh which are processable as numerical values.

The first number of revolutions specification module 40p performs a first number of revolutions specification process that specifies the number of revolutions Rs of the first rotating body 120 according to the rotational angles θs and θm. The second number of revolutions specification module 40q performs a second number of revolutions specification process that specifies the number of revolutions Rm of the second rotating body 122 according to the rotational angles θm and θh. The rotation amount specification module 40e specifies the rotation amount θa over multiple revolutions of the first rotating body 120 according to the specified numbers of revolutions Rs and Rm and the rotational angle θs. The output module 40d converts and outputs the specified rotation amount θa as an output signal 40a in a desired format. In the example of FIG. 1, the output signal 40a is output via a connector 5c provided on the substrate 5.

(First Number of Revolutions Specification Process)

Figure 2:
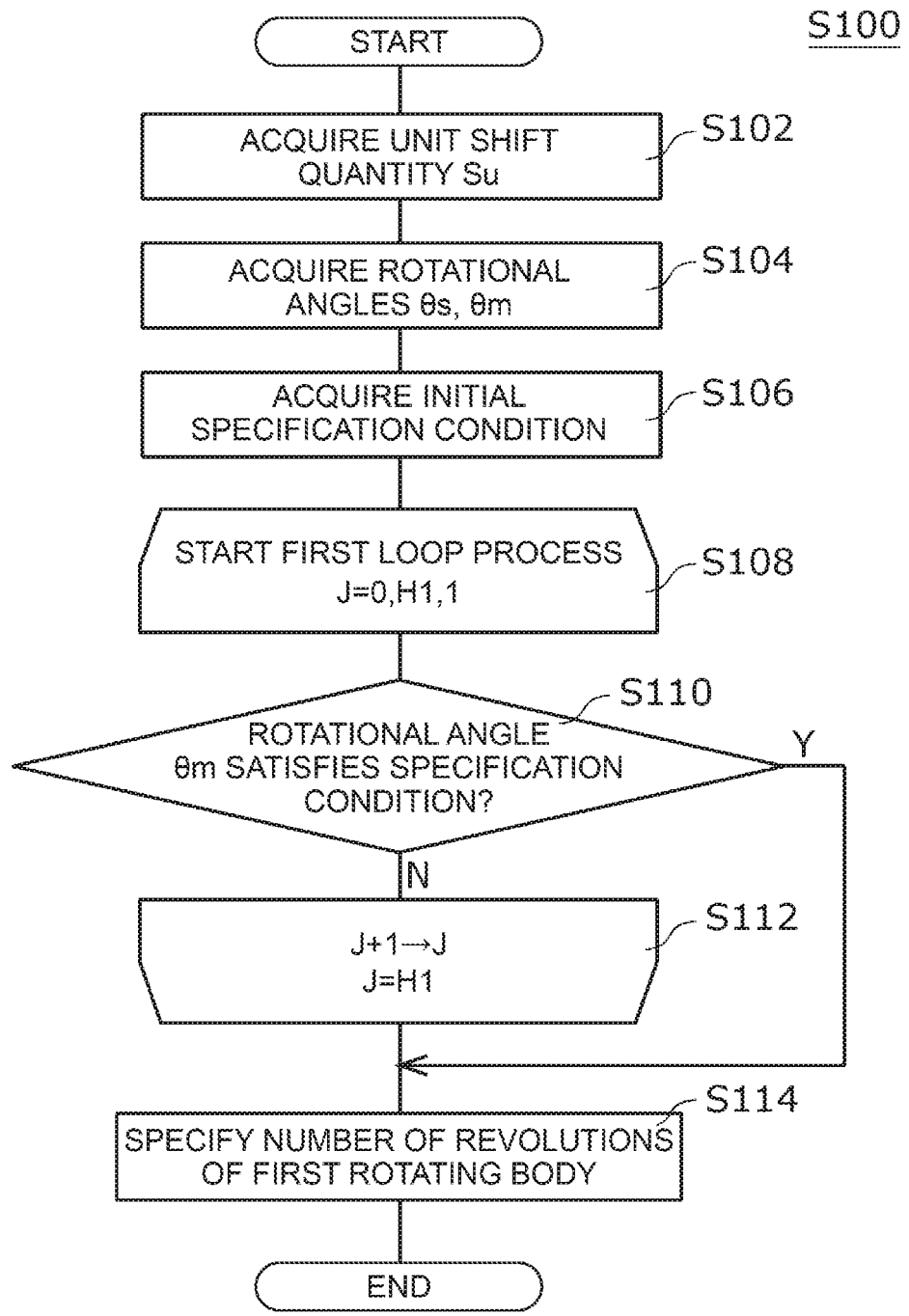
FIG. 2 A flowchart illustrating an example of a first number of revolutions specification process by the angle detection apparatus of FIG. 1.

Next, an example of the first number of revolutions specification process by the angle detection apparatus 100 according to the first embodiment will be described. FIG. 2 is a flowchart illustrating an example of the first number of revolutions specification process by the angle detection apparatus 100. FIG. 2 illustrates a process S100 of specifying the number of revolutions Rs of the first rotating body 120 according to the rotational angle θs and the rotational angle θm. The process S100 includes a process of dynamically varying the specification condition and a process of specifying the number of revolutions Rs that satisfies the varied specification condition.

Particularly, the process S100 includes a process of deciding a unit shift quantity Su according to the first reduction ratio G1, a shift process that shifts the specification condition by the unit shift quantity Su, a determination process that determines whether or not the rotational angle θm satisfies the shifted specification condition, an update process that repeats the shift process and the determination process and updates a loop counter value J until the specification condition is satisfied, and a specification process that specifies the number of revolutions Rs according to the loop counter value J when the specification condition has been satisfied.

When the process S100 is started, the processor 40 acquires the unit shift quantity Su according to the first reduction ratio G1 (step S102). In this step, the processor 40 can acquire the unit shift quantity Su by evaluating Formula 2.

$$\text{Unit shift quantity } Su = 360° \times \text{first reduction ratio } G1 = 360/60 = 6° \quad \text{(Formula 2)}$$

When the unit shift quantity Su is acquired, the processor 40 uses the rotational angle acquisition modules 40s and 40m to acquire the rotational angles θs and θm which are processable as numerical values on the basis of the rotational angles θso and θmo which are the detection results from the angle sensors As and Am (step S104). When the rotational angles are acquired, the processor 40 acquires a lower limit value Lm and an upper limit value Ln as an initial specification condition according to the rotational angle θs and the first reduction ratio G1 (step S106). In this step, the processor 40 can acquire the lower limit value Lm and the upper limit value Ln (initial values) by evaluating Formulas 3 and 4.

$$\text{Lower limit value } Lm = \text{rotational angle } \theta s \times \text{first reduction ratio } G1 - \text{unit shift quantity } Su/2 = \text{rotational angle } \theta s/60 - 3° \quad \text{(Formula 3)}$$

$$\text{Upper limit value } Ln = \text{rotational angle } \theta s \times \text{first reduction ratio } G1 + \text{unit shift quantity } Su/2 = \text{rotational angle } \theta s/60 + 3° \quad \text{(Formula 4)}$$

When the initial specification condition is acquired, the processor 40 sets an initial value, an end value, and an increment value of the loop counter value J, and starts a first loop process (step S108). In the example of FIG. 2, in this step, the processor 40 sets initial value=0, end value=H1=1/G1=60, and increment value=1. In other words, the loop counter value J is updated by 1 one at a time from 0 to 60.

When the first loop process is started, the processor 40 determines whether or not the rotational angle θm satisfies the specification condition (step S110). In the example of FIG. 2, the specification condition is expressed by Formula 5. That is, the processor 40 determines whether or not the rotational angle θm satisfies the condition of being (Lm+J·Su) or greater and also less than (Ln+J·Su).

$$(Lm + J \cdot Su) \leq \theta m < (Ln + J \cdot Su) \quad \text{(Formula 5)}$$

Note that Formula 5 can be rearranged into Formula 6, and the specification condition may be set according to Formula 6.

$$Lm \leq (\theta m - J \cdot Su) < Ln \quad \text{(Formula 6)}$$

In the case where the rotational angle θm does not satisfy the specification condition (step S110, N), the processor 40 performs an end determination of the first loop process (step S112). In this step, the processor 40 increments the loop counter value J by 1, and repeats the first loop process in the case where the loop counter value J has not reached the end value H1, or ends the first loop process and proceeds to step S114 in the case where the loop counter value J has reached H1. In other words, the first loop process is a process of updating the loop counter value J until the rotational angle θm satisfies the specification condition. By updating the loop counter value J, the specification condition is dynamically varied by the unit shift quantity Su at a time according to the loop counter value J. In other words, the specification condition is dynamically shifted by the unit shift quantity Su with every loop of the loop process.

In the case where the first loop process ends and in the case where the rotational angle θm satisfies the specification condition (step S110, Y), the processor 40 specifies the number of revolutions Rs of the first rotating body 120 according to the loop counter value J (step S114). In the example of FIG. 2, the number of revolutions Rs is specified by Formula 7.

Number of revolutions $Rs$=loop counter value $J$ (Formula 7)

When step S114 is executed, the processor 40 ends the process S100. The process S100 may be executed at preset intervals, or the rotational angles θs and θm may be stored and the process S100 may be executed when either of the rotational angles θs and θm changes. The process S100 may also be executed upon request from external equipment. Note that the process S100 is merely an example, and it is also possible to add other steps, remove some of the steps, or change the order of the steps. The process S100 may also be configured by modifying the calculation formulas described above.

FIG. 3 is a table illustrating an example of the loop counter value J, the specification condition, and the determination result. FIG. 3 illustrates the case in which the rotational angle θs=180°, the rotational angle θm=12°, and Su=6°. As FIG. 3 illustrates, the specification condition is dynamically varied according to the loop counter value J. In the case where θs=180°, the rotational angle θm satisfies the specification condition when the loop counter value J=2, and the number of revolutions Rs=2 is specified.

FIG. 4 is a table illustrating another example of the loop counter value J, the specification condition, and the determination result. FIG. 4 illustrates the case in which the rotational angle θs=181°, the rotational angle θm=12°, and Su=6°. In the case where θs=181°, the rotational angle θm satisfies the specification condition when the loop counter value J=1, and the number of revolutions Rs=1 is specified. In this way, the specified number of revolutions Rs varies depending on the rotational angle θs, even if the rotational angle θm is the same.

(Second Number of Revolutions Specification Process)

Figure 5:
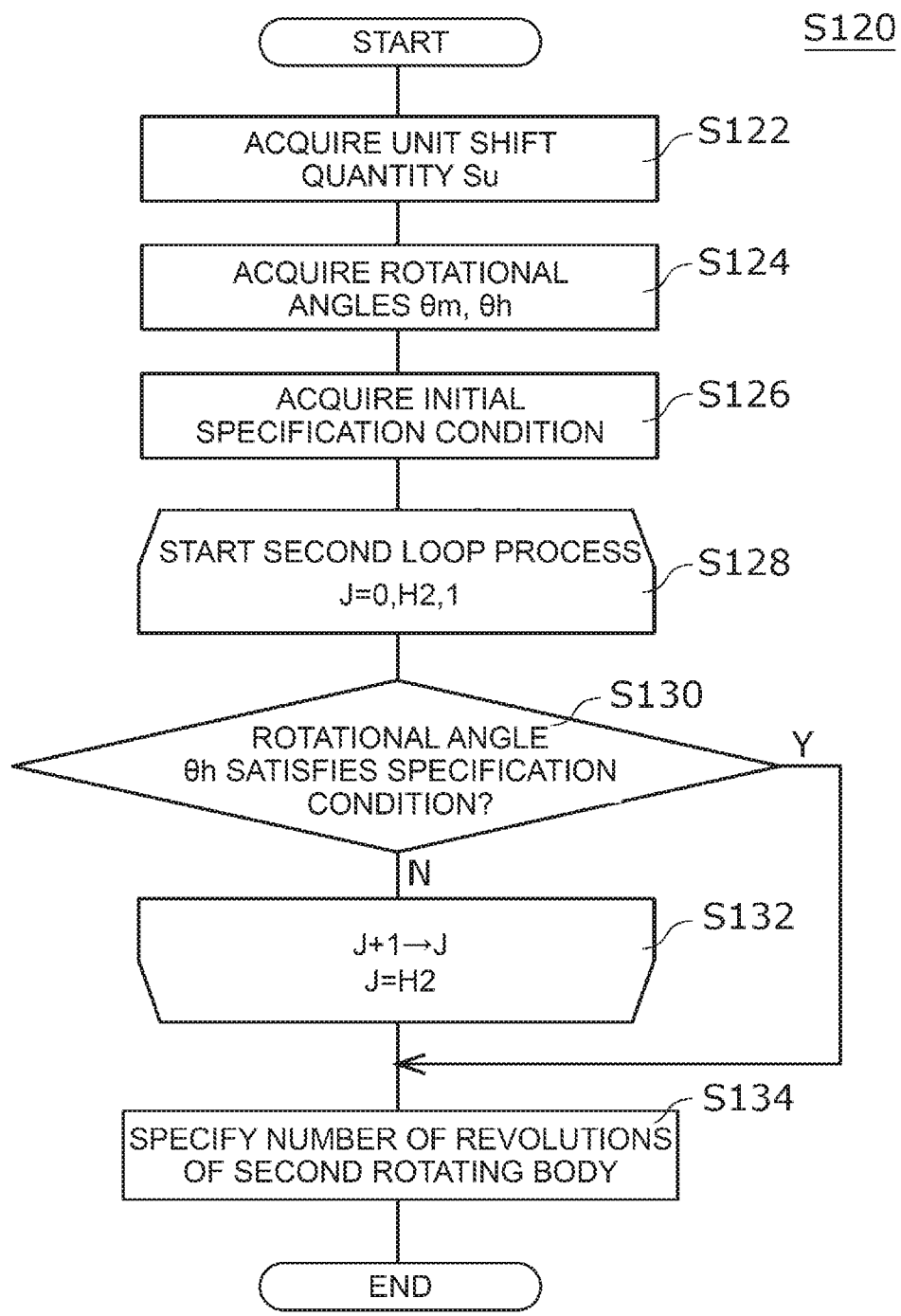
FIG. 5 A flowchart illustrating an example of a second number of revolutions specification process by the angle detection apparatus of FIG. 1.

Next, an example of the second number of revolutions specification process by the angle detection apparatus 100 according to the first embodiment will be described. FIG. 5 is a flowchart illustrating an example of the second number of revolutions specification process by the angle detection apparatus 100. FIG. 5 illustrates a process S120 of specifying the number of revolutions Rm of the second rotating body 122 according to the rotational angle θm and the rotational angle θh. The process S120 is a process based on the same algorithm as the process S100. The process S120 includes a process of dynamically varying the specification condition and a process of specifying the number of revolutions that satisfies the varied specification condition.

Particularly, the process S120 includes a process of deciding the unit shift quantity Su according to the second reduction ratio G2, a shift process that shifts the specification condition by the unit shift quantity Su, a determination process that determines whether or not the rotational angle θh satisfies the shifted specification condition, an update process that repeats the shift process and the determination process and updates the loop counter value J until the specification condition is satisfied, and a specification process that specifies the number of revolutions Rm according to the loop counter value J when the specification condition has been satisfied.

When the process S120 is started, the processor 40 acquires the unit shift quantity Su according to the second reduction ratio G2 (step S122). In this step, the processor 40 can acquire the unit shift quantity Su by evaluating Formula 8.

Unit shift quantity $Su$=360°×second reduction ratio $G2$=360/12=30° (Formula 8)

When the unit shift quantity Su is acquired, the processor 40 uses the rotational angle acquisition modules 40*m* and 40*h* to acquire the rotational angles θm and θh which are processable as numerical values on the basis of the rotational angles θmo and θho which are the detection results from the angle sensors Am and Ah (step S124).

When the rotational angles are acquired, the processor 40 acquires the lower limit value Lm and the upper limit value Ln as the initial specification condition according to the rotational angle θm and the second reduction ratio G2 (step S126). In this step, the processor 40 can acquire the lower limit value Lm and the upper limit value Ln (initial values) by evaluating Formulas 9 and 10.

Lower limit value $Lm$=rotational angle θ$m$×second reduction ratio $G2$−unit shift quantity $Su$/2=rotational angle θ$m$/12−15° (Formula 9)

Upper limit value $Ln$=rotational angle θ$m$×second reduction ratio $G2$+unit shift quantity $Su$/2=rotational angle θ$m$/12+15° (Formula 10)

When the initial specification condition is acquired, the processor 40 sets an initial value, an end value, and an increment value of the loop counter value J, and starts a second loop process (step S128). In the example of FIG. 5, in this step, the processor 40 sets initial value=0, end value=H2=1/G2=12, and increment value=1. In other words, the loop counter value J is updated by 1 at a time from 0 to 12.

When the second loop process is started, the processor 40 determines whether or not the rotational angle θh satisfies the specification condition (step S130). In the example of FIG. 5, the specification condition is expressed by Formula 11. That is, the processor 40 determines whether or not the rotational angle θh satisfies the condition of being (Lm+J·Su) or greater and also less than (Ln+J·Su).

$(Lm+J·Su) \leq θh < (Ln+J·Su)$ (Formula 11)

Note that Formula 11 can be rearranged into Formula 12, and the specification condition may be set according to Formula 12.

$Lm \leq (θh−J·Su) < Ln$ (Formula 12)

In the case where the rotational angle θh does not satisfy the specification condition (step S130, N), the processor 40 performs an end determination of the second loop process (step S132). In this step, the processor 40 increments the loop counter value J by 1, and repeats the second loop process in the case where the loop counter value J has not reached the end value H2, or ends the second loop process and proceeds to step S134 in the case where the loop counter value J has reached H2. In other words, the second loop process is a process of updating the loop counter value J until the rotational angle θh satisfies the specification condition. By updating the loop counter value J, the specification condition is dynamically varied by the unit shift quantity Su at a time according to the loop counter value J. In other words, the specification condition is dynamically shifted by the unit shift quantity Su with every loop of the loop process.

In the case where the second loop process ends and in the case where the rotational angle θh satisfies the specification condition (step S130, Y), the processor 40 specifies the number of revolutions Rm of the second rotating body 122 according to the loop counter value J (step S134). In the example of FIG. 5, the number of revolutions Rm is specified by Formula 13.

Number of revolutions $Rm$=loop counter value $J$ (Formula 13)

When step S134 is executed, the processor 40 ends the process S120. The process S120 may be executed at preset intervals, or the rotational angles θm and θh may be stored and the process S120 may be executed when either of the rotational angles θm or θh changes. The process S120 may also be executed upon request from external equipment. Note that the process S120 is merely an example, and it is also possible to add other steps, remove some of the steps, or change the order of the steps. The process S120 may also be configured by modifying the calculation formulas described above.

(Rotation Amount Specification Process)

When the numbers of revolutions Rs and Rm are specified by the processes S100 and S120, the rotation amount specification module 40e specifies the rotation amount θa over multiple revolutions of the first rotating body 120 according to the numbers of revolutions Rs and Rm and the rotational angle θs. The rotation amount θa can be specified by Formula 14.

$\theta a = 360 \times (Rm/G1 + Rs) + \theta s$ (Formula 14)

When the rotation amount θa is specified, the output module 40d converts and outputs the rotation amount θa as the output signal 40a in a desired format.

Next, the effects and advantages of the angle detection apparatus 100 according to the first embodiment configured in this way will be described.

The angle detection apparatus 100 according to the first embodiment is provided the first rotating body 120, the second rotating body 122, the first transmission mechanism 111 that causes the second rotating body 122 to rotate by reducing the speed of the rotation of the first rotating body 120, the first angle detector Ds that detects the rotational angle θso of the first rotating body 120, the second angle detector Dm that detects the rotational angle θmo of the second rotating body 122, and the processor 40 that specifies the number of revolutions Rs of the first rotating body 120. The processor 40 specifies the number of revolutions Rs while dynamically varying the specification condition for specifying the number of revolutions Rs according to the lower limit value, the upper limit value, and the detected rotational angle of the second rotating body 122, the upper limit value and the lower limit value being numerical values decided according to the detected rotational angle of the first rotating body 120 and the first reduction ratio G1 of the first transmission mechanism 111. According to this configuration, compared to the case where the specification condition is fixed, when the rotational angle θmo is near a boundary value, fluctuation in the specification result of the number of revolutions Rs due to the influence of mechanical error can be suppressed. The angle detection apparatus 100 can be configured using a transmission mechanism with few stages, and increased bulkiness of the apparatus can be suppressed. The angle detection apparatus 100 has a wide tolerance range of mechanical error, alignment of the members is easy, and the labor of manufacturing can be reduced. With the angle detection apparatus 100, the accuracy of detecting the number of revolutions Rs is improved, and resistance to disturbances such as external forces, vibrations, and backlash, resistance to leakage flux, and the like is improved. With the angle detection apparatus 100, the labor of inputting ideal rotation data such as a correction angle into non-volatile memory can be skipped, and space can be saved in the non-volatile memory.

In the angle detection apparatus 100 according to the first embodiment, the processor 40 performs a shift process that shifts the specification condition for specifying the number of revolutions Rs by the unit shift quantity Su at a time, a determination process that determines whether or not the detection result from the second angle detector Dm satisfies the specification condition shifted by the shift process, an update process that repeats the shift process and the determination process and updates the loop counter value J until a predetermined condition is satisfied, and a process of specifying the number of revolutions Rs according to the loop counter value J when the detection result from the second angle detector Dm satisfies the specification condition shifted by the shift process. According to this configuration, the number of revolutions Rs can be specified while dynamically varying the specification condition with the shift process. Compared to the case in which the specification condition is fixed, the influence of fluctuations in the error or the threshold value of the sensor can be suppressed.

The foregoing description is based on the first embodiment of the present invention. This embodiment is an illustrative example, and it should be understood to persons skilled in the art that various variants and alterations are possible within the scope of claims of the present invention, and furthermore that such variants and alterations are also to be included in the scope of the claims of the present invention. Consequently, the description and drawings in this specification should be treated as illustrative rather than limiting.

Hereinafter, variants of the first embodiment will be described. In the drawings and description of the variants, components and members that are identical or substantially the same as the first embodiment are denoted with the same signs. Descriptions that overlap with the first embodiment are omitted where appropriate, and configurations that differ from the first embodiment are mainly described.

(First Variant)

In the description of the first embodiment, an example in which the shift process shifts the specification condition by the unit shift quantity Su at a time to acquire the changed specification condition is described, but the configuration is not limited thereto. As expressed in Formulas 6 and 12, in the shift process, a numerical value obtained by shifting θm based on the detection result from the second angle detector Dm by the unit shift quantity Su at a time may be acquired, and in the determination process, a determination of whether or not the numerical value acquired by the shift process satisfies the specification condition may be performed.

The first variant will be described. In the first variant, the process by the first number of revolutions specification module is different from the angle detection apparatus 100 according to the first embodiment while the rest of the configuration is similar, and therefore the matters that differ will be described. The first number of revolutions specification module according to the first variant performs a process of deciding the unit shift quantity Su according to the first reduction ratio G1, a shift process that acquires a numerical value θms obtained by shifting θm based on the detection result from the second angle detector Dm by the unit shift quantity Su, a determination process that determines whether or not the numerical value θms acquired by the shift process satisfies the specification condition, and an update process that repeats the shift process and the determination process and updates the loop counter value J until the specification condition is satisfied, and specifies the number of revolutions according to the loop counter value J when the specification condition has been satisfied. According to the first variant, effects and advantages similar to the first embodiment are exhibited. Moreover, according to the first variant, the number of revolutions Rs of the first rotating body 120 can be specified while dynamically varying a relative specification condition. Compared to the case in which the specification condition is fixed, the influence of fluctuations in the error or the threshold value of the sensor can be suppressed.

(Second Variant)

In the description of the first embodiment, an example in which the third rotating body 124 is provided is described, but the configuration is not limited thereto. It is not necessary for the angle detection apparatus to be provided with a third rotating body.

(Third Variant)

In the description of the first embodiment, an example in which rotation is transmitted from the second rotating body 122 to the third rotating body 124 is described, but the configuration is not limited thereto. Rotation may also be transmitted from the first rotating body 120 to the third rotating body 124 without going through the second rotating body 122.

(Fourth Variant)

In the description of the first embodiment, an example in which the first transmission mechanism 111 and the second transmission mechanism 115 contain spur gears is described, but the configuration is not limited thereto. These transmission mechanisms may also include different types of transmission elements other than spur gears. These transmission mechanisms may also include components such as worm gears, worm wheels, missing teeth gears, chains, and belts. The first transmission mechanism 111 and the second transmission mechanism 115 may also include a transmission mechanism with two or more stages.

Second Embodiment

Next, a second embodiment of the present invention will be described. In the first embodiment, an example in which rotation is transmitted from the first rotating body 120 to the second rotating body 122 through a one-stage transmission mechanism, namely the first transmission mechanism 111, is described, but the present invention is not limited thereto. Rotation may also be transmitted from the first rotating body to the second rotating body through a plurality of transmission mechanisms. In the second embodiment, an example in which rotation is transmitted from the first rotating body to the second rotating body through two transmission mechanisms is described. By adopting a plurality of transmission mechanisms, the embodiment is capable of increasing the reduction ratio and expanding the specification range of the number of revolutions. Because the number of revolutions is specified while dynamically varying the specification condition, the alignment of the rotating bodies is easy even if the reduction ratio is increased, and the labor of manufacturing can be reduced.

Figure 6:
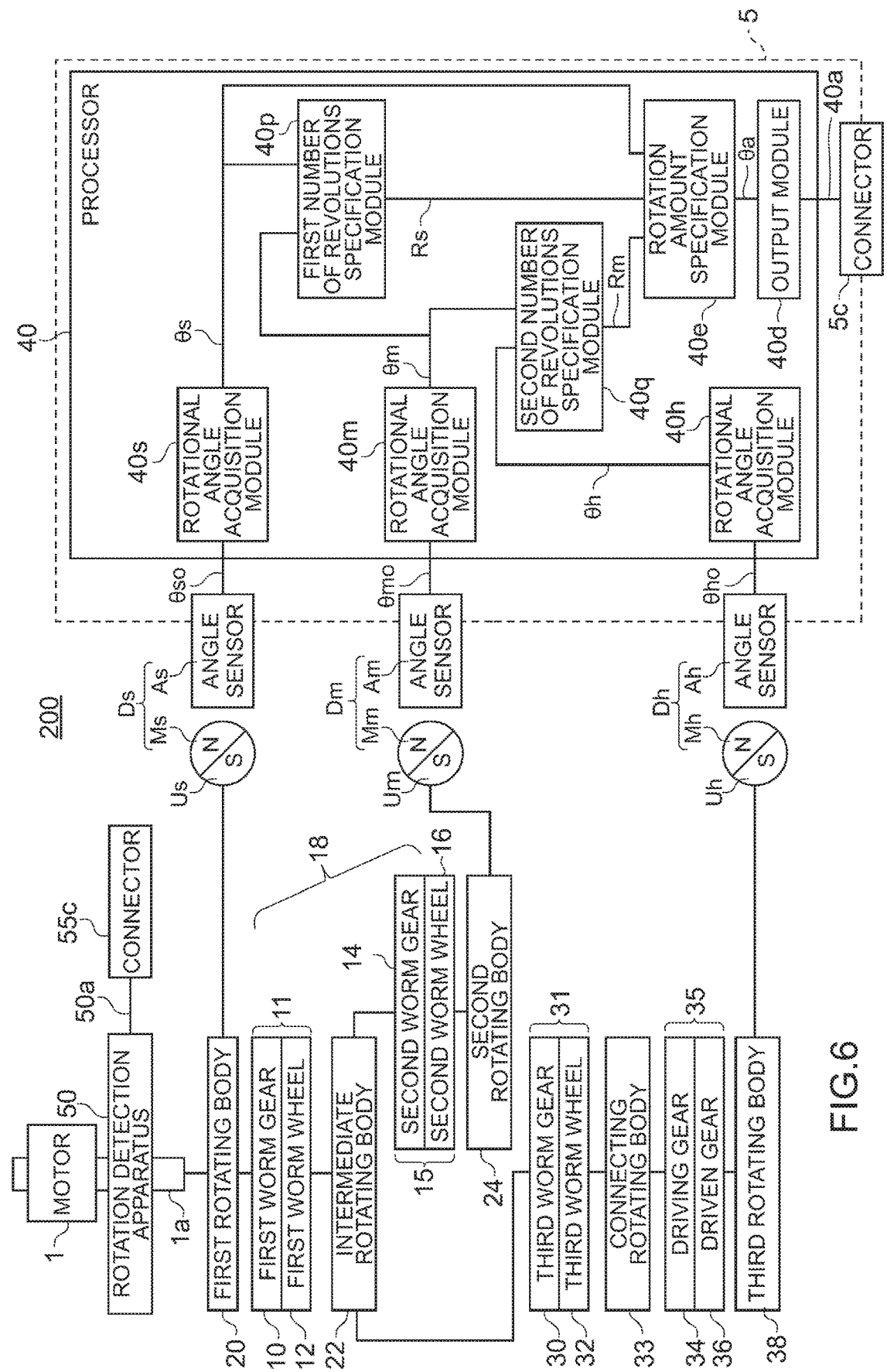
FIG. 6 A block diagram illustrating an example of a configuration of an angle detection apparatus according to a second embodiment of the present invention.
Figure 7:
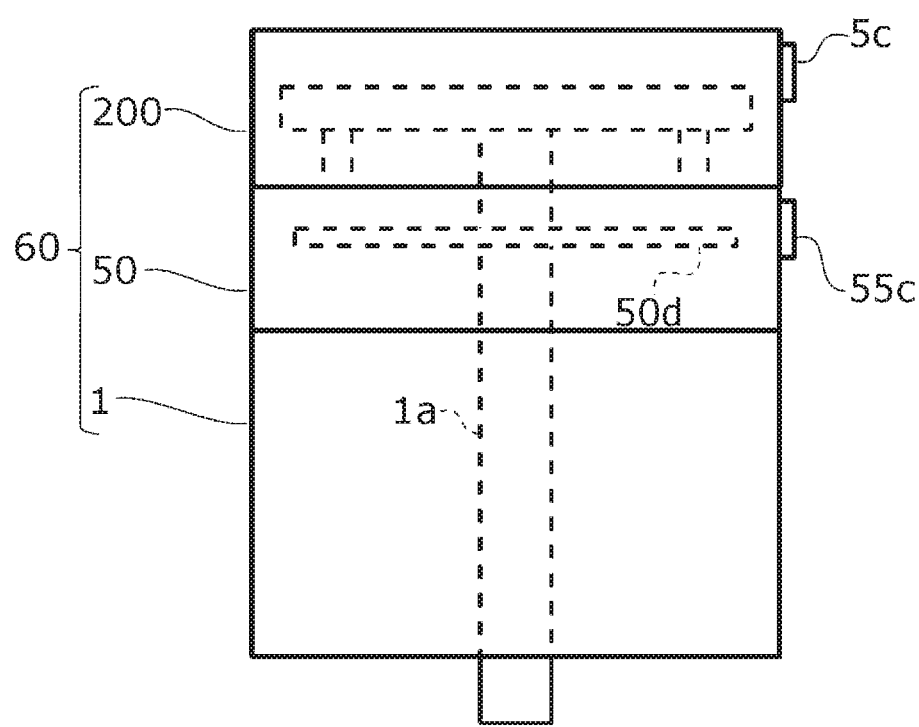
FIG. 7 A schematic diagram of a motor unit that includes the angle detection apparatus of FIG. 6.
Figure 8:
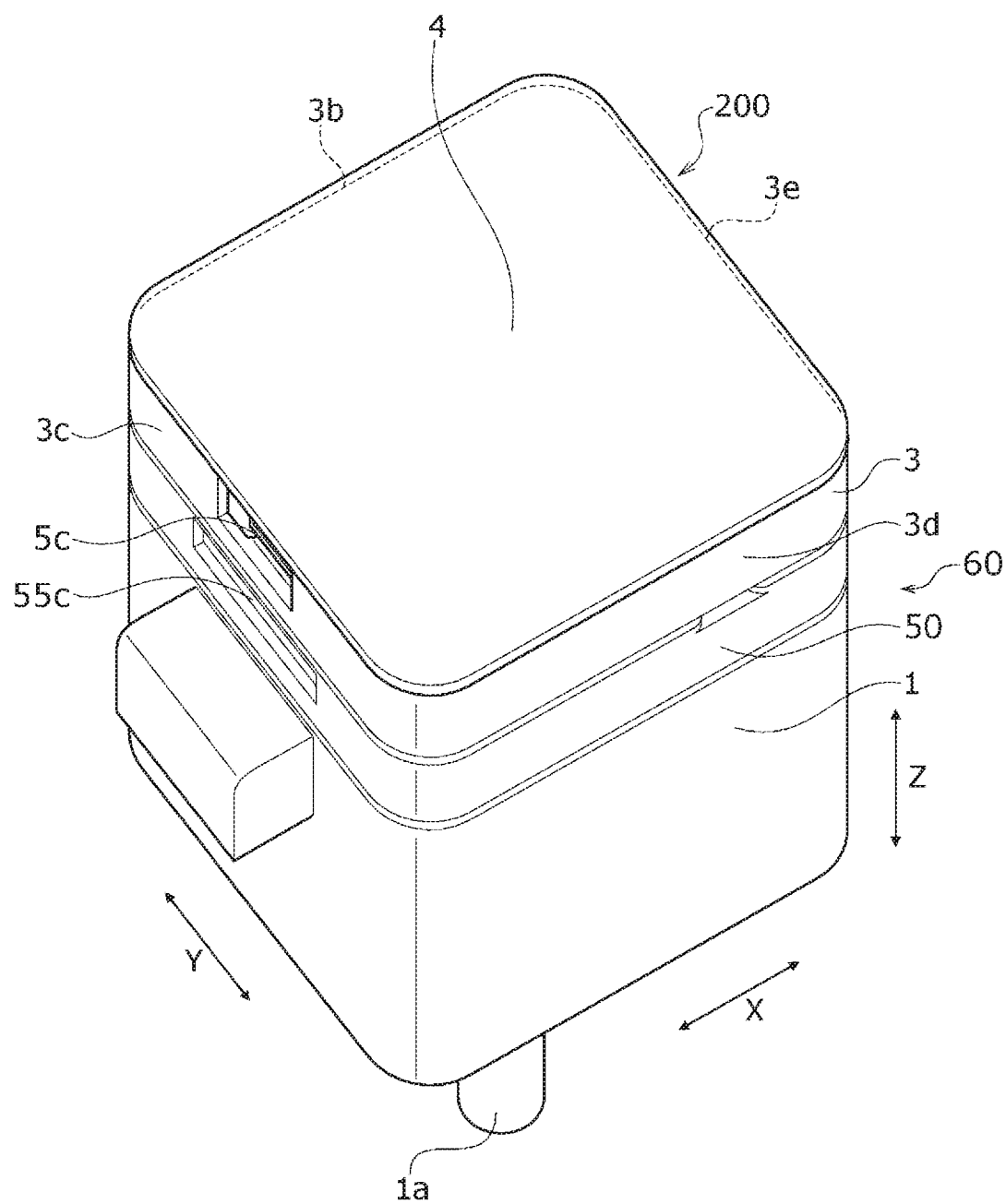
FIG. 8 A perspective view of a motor unit that includes the angle detection apparatus of FIG. 6.
Figure 9:
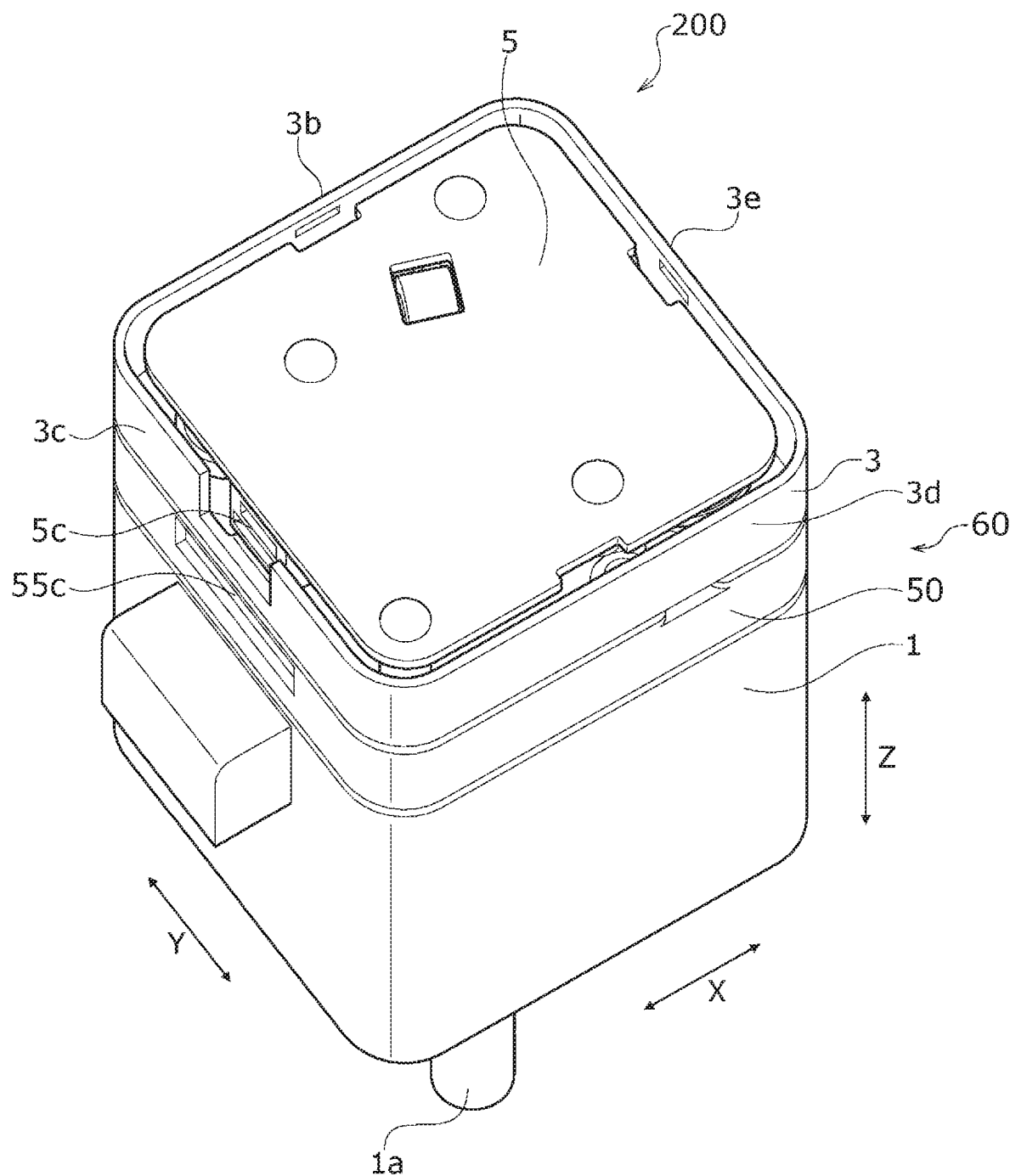
FIG. 9 Another perspective view of a motor unit that includes the angle detection apparatus of FIG. 6.

FIG. 6 is a block diagram illustrating an example of a configuration of an angle detection apparatus 200 according to the second embodiment of the present invention. FIG. 6 illustrates the angle detection apparatus 200 in a combined state with the motor 1 and a rotation detection apparatus 50. The rotation detection apparatus 50 will be described later. The assembly of the angle detection apparatus 200 and the rotation detection apparatus 50 attached to the main shaft 1*a* of the motor 1 is referred to as a motor unit 60. FIG. 7 is a schematic diagram of the motor unit 60 that includes the angle detection apparatus 200. FIG. 8 is a perspective view of the motor unit 60 that includes the angle detection apparatus 200. FIG. 9 is another perspective view of the motor unit 60 that includes the angle detection apparatus 200. FIG. 9 illustrates a state in which a lid 4 has been removed from a housing 3. In this state, the substrate 5 is provided covering the encoder interior.

Figure 10:
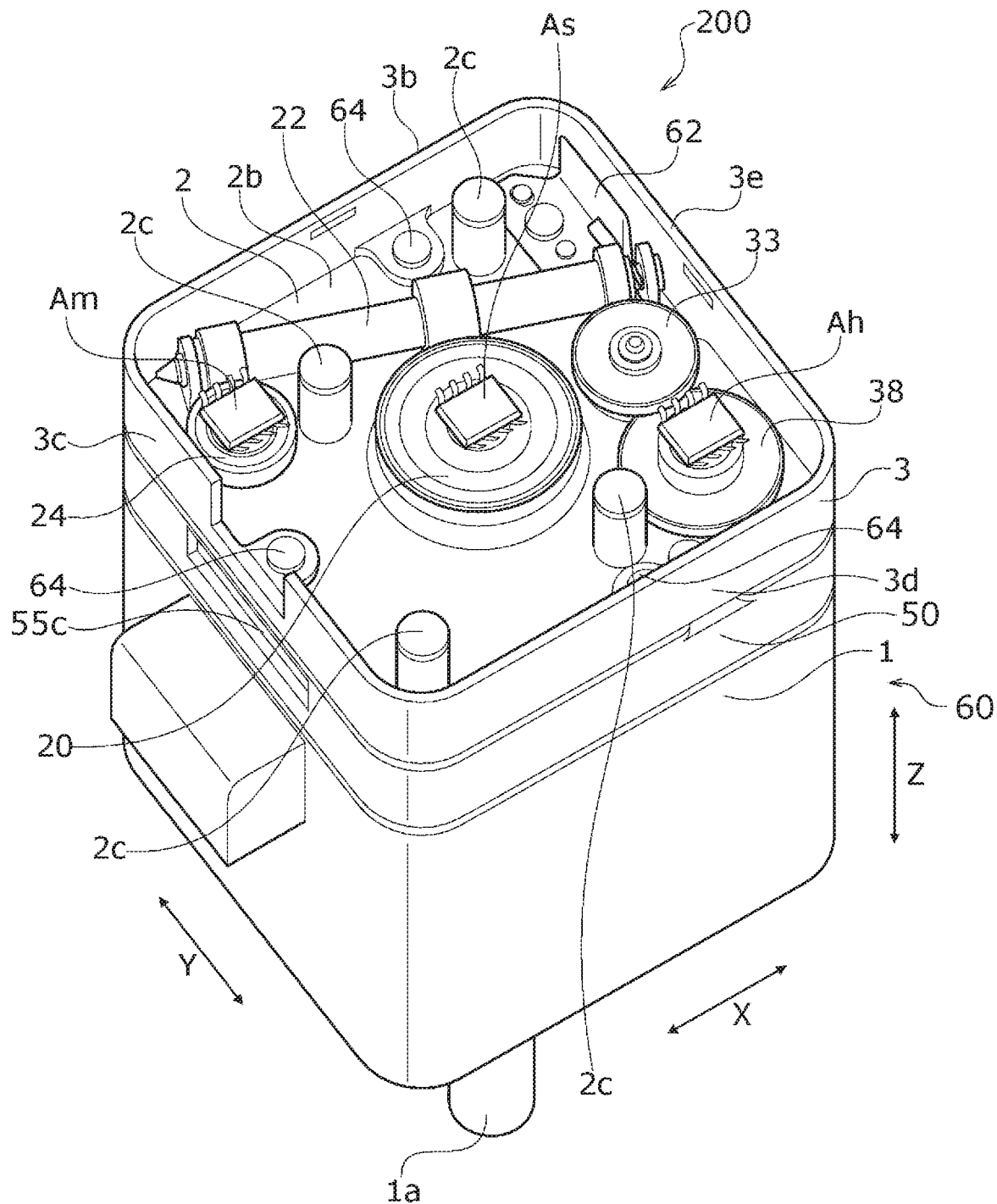
FIG. 10 Yet another perspective view of a motor unit that includes the angle detection apparatus of FIG. 6.
Figure 11:
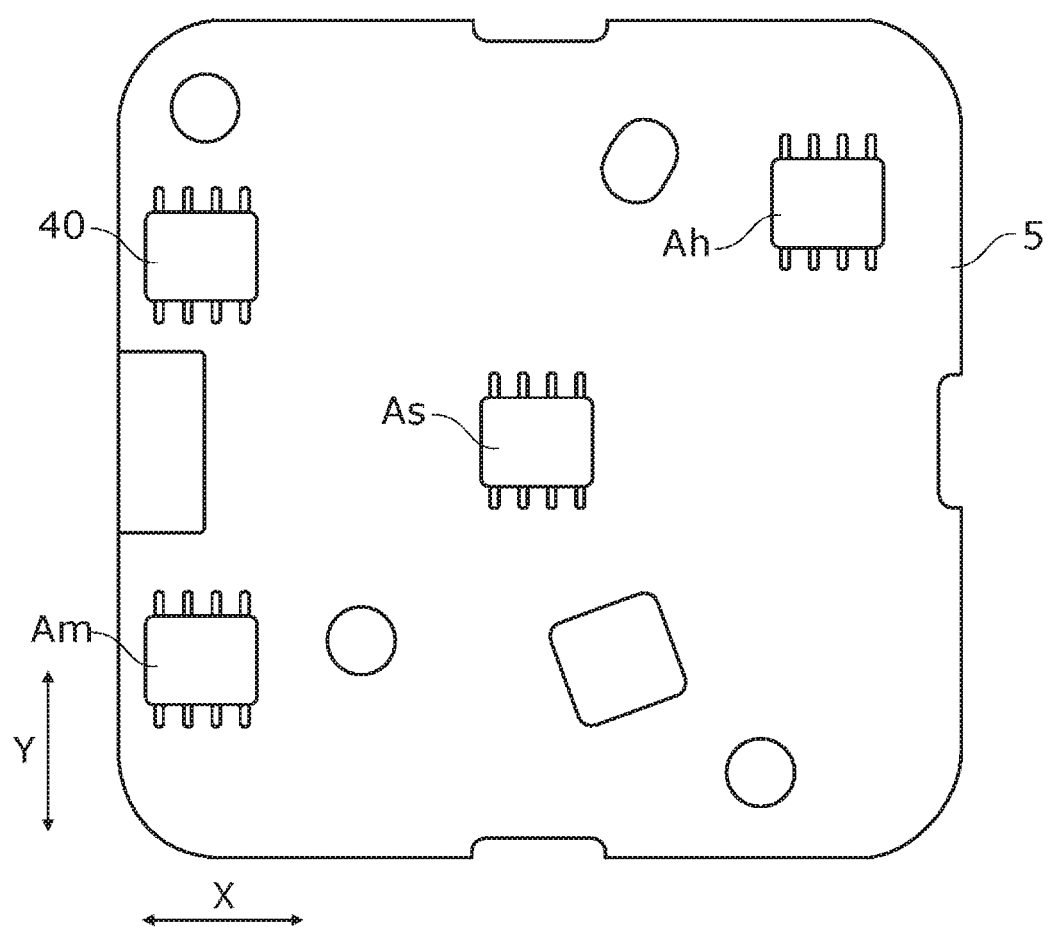
FIG. 11 A bottom view of a substrate of the angle detection apparatus of FIG. 6.
Figure 12:
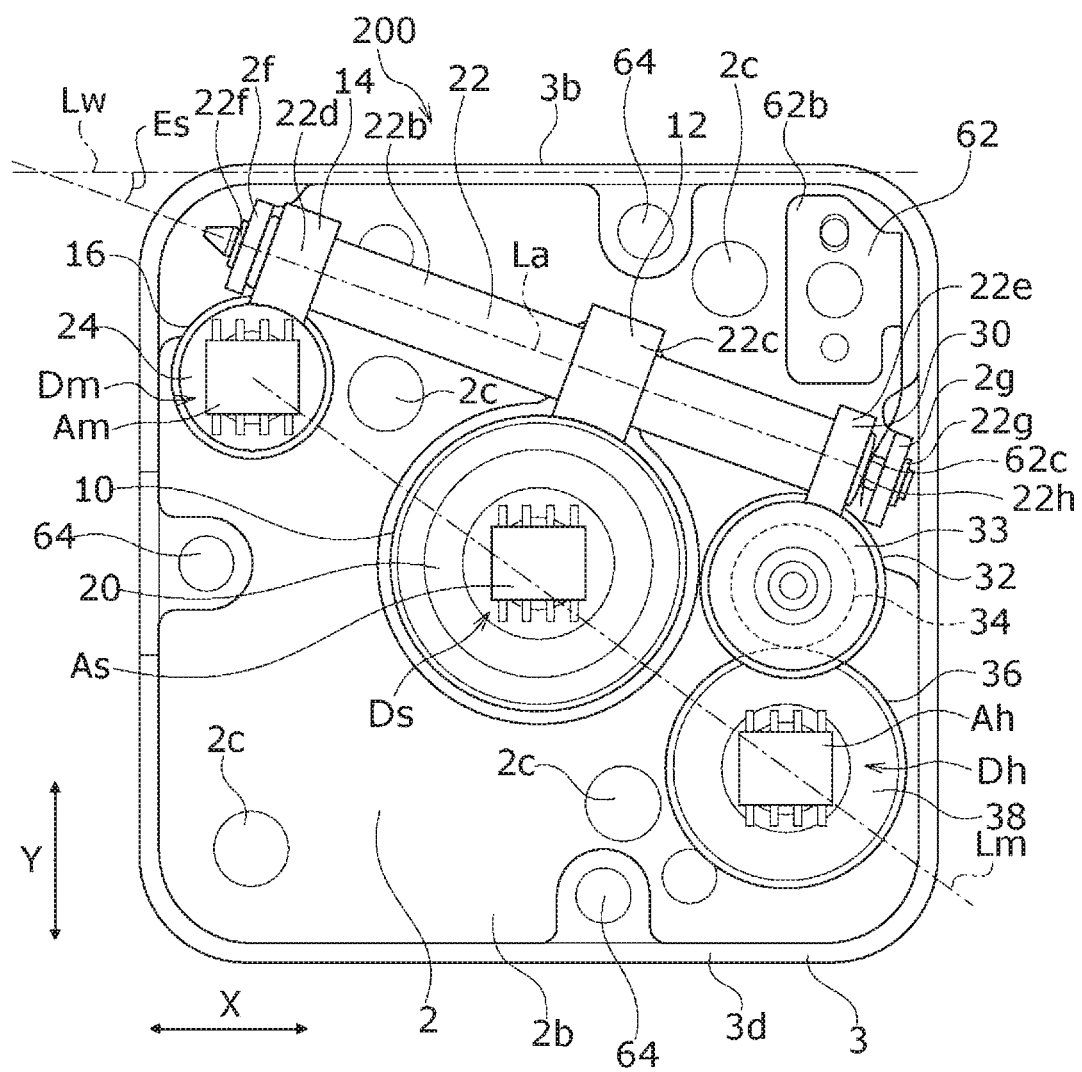
FIG. 12 A plan view of the angle detection apparatus of FIG. 6.
Figure 13:
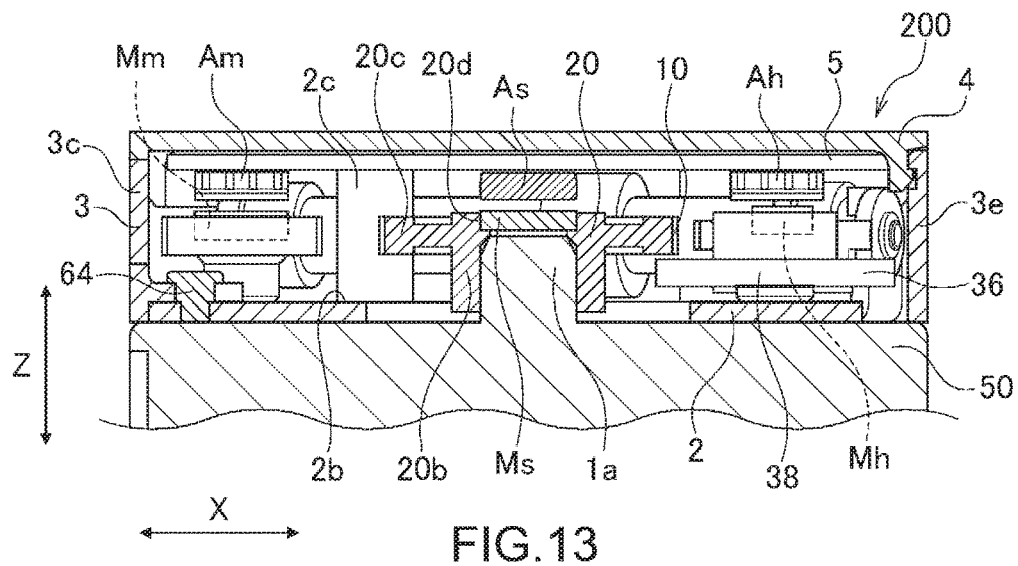
FIG. 13 A front view that includes a partial cross-section of the angle detection apparatus of FIG. 6.

FIG. 10 is yet another perspective view of the motor unit 60 that includes the angle detection apparatus 200. FIG. 11 is a bottom view of the substrate 5. The substrate 5 is a tabular printed circuit board that is substantially rectangular from a plan view and thin in the axial direction. FIG. 12 is a plan view of the angle detection apparatus 200. FIGS. 10 and 12 illustrate a state with the substrate 5 removed. The angle sensors Am, As, and Ah are attached to the substrate 5, but in these drawings, the angle sensors Am, As, and Ah are displayed for the sake of easier comprehension. FIG. 13 is a front view of the angle detection apparatus 200. FIG. 13 illustrates a state obtained by cutting the angle detection apparatus 200 along a plane parallel to a Z-axis direction that passes through the center of the main shaft 1*a*.

Figure 14:
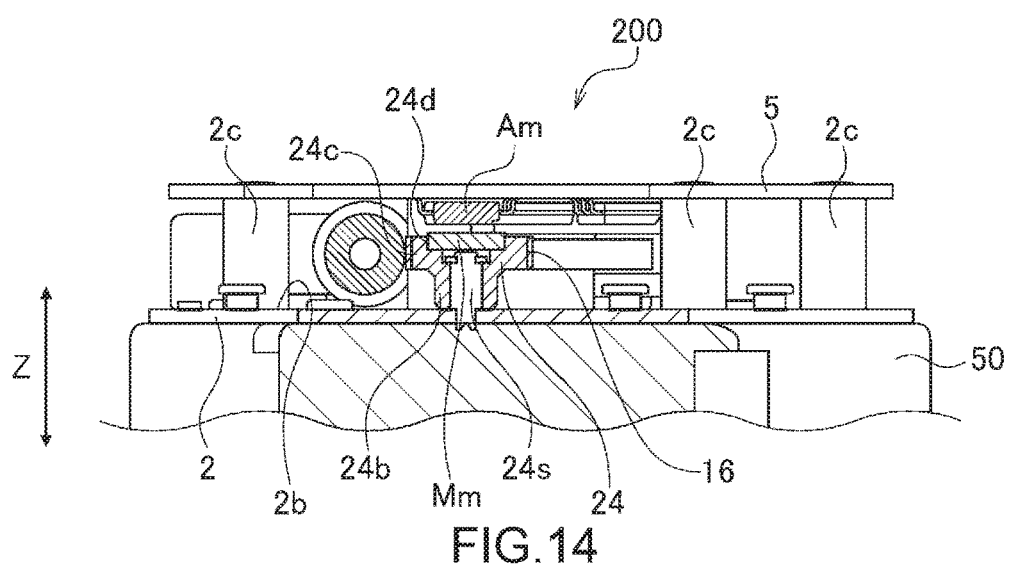
FIG. 14 A cross-section view illustrating the surroundings of a second rotating body in the angle detection apparatus of FIG. 6.
Figure 15:
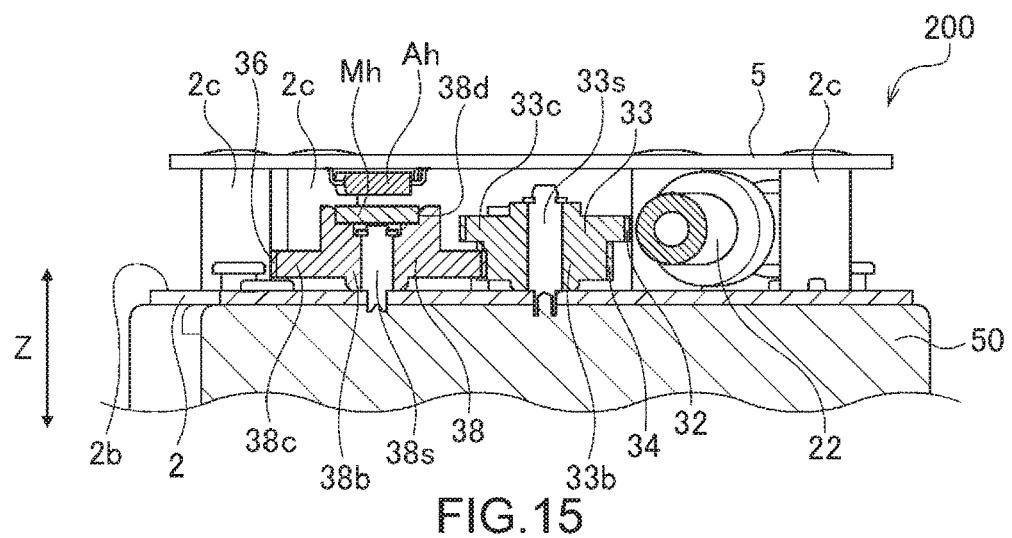
FIG. 15 A cross-section view illustrating the surroundings of a third rotating body and a connecting rotating body in the angle detection apparatus of FIG. 6.

FIG. 14 is a cross-section view illustrating the surroundings of a second rotating body 24. FIG. 14 illustrates a longitudinal view of the angle detection apparatus 200 from the substantially left side. FIG. 14 illustrates a state obtained by cutting the angle detection apparatus 200 along a plane that passes through the center of the second rotating body 24, perpendicular to the rotational axis line of an intermediate rotating body 22 and parallel to the Z-axis direction. FIG. 15 is a cross-section view illustrating the surroundings of a third rotating body 38 and a connecting rotating body 33. FIG. 15 illustrates a longitudinal view of the angle detection apparatus 200 from the substantially right side. FIG. 15 illustrates a state obtained by cutting the angle detection apparatus 200 along a plane parallel to the Z-axis direction that passes through the center of the third rotating body 38 and the center of the connecting rotating body 33. In FIGS. 14 and 15, the housing 3 and the lid 4 are omitted from illustration.

The description hereinafter is based on an XYZ orthogonal coordinate system. The X-axis direction corresponds to the horizontal left-and-right direction, the Y-axis direction corresponds to the horizontal forward-and-back direction, and the Z-axis direction corresponds to the vertical up-and-down direction. The Y-axis direction and the Z-axis direction are each orthogonal to the X-axis direction. The X-axis direction may be described as the left direction or the right direction, the Y-axis direction may be described as the forward direction or the back direction, and the Z-axis direction may be described as the up direction or the down direction. In the drawings, a state viewed from up in the Z-axis direction is referred to as a plan view, a state viewed from forward in the Y-axis direction is referred to as a front view, and a state viewed from left or right in the X-axis direction is referred to as a side view. Such notation of directions does not restrict the use attitude of the motor unit 60 and the angle detection apparatus 200. The motor unit 60 and the angle detection apparatus 200 may be used in any attitude.

A motor based on known principles, such as a stepping motor or a DC brushless motor, can be adopted as the motor 1. As an example, the motor 1 may be applied as a driving source that drives a robot for industrial or other use through a reduction mechanism such as a wave gear apparatus. The main shaft 1a of the motor 1 projects outward on both sides in the Z-axis direction of the motor 1.

The angle detection apparatus 200 is an absolute encoder that specifies the rotation amount over multiple revolutions of the main shaft 1a of the motor 1. In the angle detection apparatus 200, the rotation amount over multiple revolutions of the main shaft 1a is the rotation amount θa of a first rotating body 20 described later. Note that the rotation amount over multiple revolutions can be defined as the sum of rotational angles over multiple revolutions. Also, the rotation amount over multiple revolutions of the main shaft 1a may sometimes be referred to as the absolute rotation amount of the main shaft 1a or the absolute rotation position of the main shaft 1a.

The angle detection apparatus 200 includes the main shaft 1a, the first rotating body 20, a first worm gear 10, a first worm wheel 12, an intermediate rotating body 22, a second worm gear 14, a second worm wheel 16, the second rotating body 24, a third worm gear 30, a third worm wheel 32, the connecting rotating body 33, a driving gear 34, a driven gear 36, the third rotating body 38, a first angle detector Ds, a second angle detector Dm, a third angle detector Dh, and a processor 40.

The first angle detector Ds, the second angle detector Dm, the third angle detector Dh, and the processor 40 are similar to the angle detection apparatus 100 according to the first embodiment, and a duplicate description is omitted. The first angle detector Ds detects a rotational angle θso of the first rotating body 20 that rotates as one with a magnet Ms. The second angle detector Dm detects a rotational angle θmo of the second rotating body 24 that rotates as one with a magnet Mm. The third angle detector Dh that rotates as one with a magnet Mh detects a rotational angle θho of the third rotating body 38.

The main shaft 1a is the output shaft of the motor 1, and is an input shaft that inputs rotation into the angle detection apparatus 200. The first rotating body 20 is affixed to the main shaft 1a, and is rotatably supported as one with the main shaft 1a by a bearing member of the motor 1. The first worm gear 10 is provided on the outer periphery of the first rotating body 20 such that both central axes substantially coincide, and rotates according to the rotation of the main shaft 1a. The first worm wheel 12 engages with the first worm gear 10 and rotates according to the rotation of the first worm gear 10. The first worm wheel 12 is provided on the outer periphery of the intermediate rotating body 22 such that the central axes coincide. The axial angle between the first worm wheel 12 and the first worm gear 10 is set to 90°.

There are no special limitations on the outer diameter of the first worm wheel 12, but in this example, the outer diameter of the first worm wheel 12 is set smaller than the outer diameter of the first worm gear 10. Compared to the case where the outer diameter of the first worm wheel 12 is large, the dimension in the axial direction with respect to the main shaft 1a of the encoder can be reduced.

The second worm gear 14 rotates according to the rotation of the first worm wheel 12. The second worm gear 14 is provided on the outer periphery of the intermediate rotating body 22 such that both central axes substantially coincide. The second worm wheel 16 engages with the second worm gear 14 and rotates according to the rotation of the second worm gear 14. The second worm wheel 16 is provided on the outer periphery of the second rotating body 24 such that both central axes substantially coincide. The axial angle between the second worm wheel 16 and the second worm gear 14 is set to 90°. The rotational axis line of the second worm wheel 16 is provided parallel to the rotational axis line of the first worm gear 10.

The first worm gear 10 has 1 thread, and the first worm wheel 12 has 20 teeth. In other words, the first worm gear 10 and the first worm wheel 12 form a first worm transmission mechanism 11 having a 1/20 reduction ratio. When the first worm gear 10 completes 20 revolutions, the first worm wheel 12 completes 1 revolution. The first worm wheel 12 causes the intermediate rotating body 22 to rotate, and the intermediate rotating body 22 causes the second worm gear 14 to rotate. Consequently, when the first worm wheel 12 completes 1 revolution, the intermediate rotating body 22 and the second worm gear 14 complete 1 revolution.

The second worm gear 14 has 5 threads, and the second worm wheel 16 has 25 teeth. In other words, second worm gear 14 and the second worm wheel 16 form a second worm transmission mechanism 15 having a 1/5 reduction ratio. When the second worm gear 14 completes 5 revolutions, the second worm wheel 16 completes 1 revolution. The second worm wheel 16 causes the second rotating body 24 and the magnet Mm to rotate.

The first worm transmission mechanism 11, the intermediate rotating body 22, and the second worm transmission mechanism 15 form a transmission mechanism 18 that reduces the rotation of the first rotating body 20 by 1/100, and transmits the reduced rotation to the second rotating body 24. In other words, the second rotating body 24 rotates at a first reduction ratio K1=1/100 with respect to the rotation of the first rotating body 20. When the first rotating body 20 completes 100 revolutions, the intermediate rotating body 22 completes 5 revolutions, while the second rotating body 24 and the magnet Mm complete 1 revolution.

When the first rotating body 20 rotates 360° (1 revolution), the second rotating body 24 and the magnet Mm rotate 3.6°. The angle sensor Am can specify 1 revolution of the first rotating body 20 every 3.6°, and can specify the rotation amount for 100 revolutions of the first rotating body 20.

The third worm gear 30 rotates according to the rotation of the first worm wheel 12. The third worm gear 30 is provided on the outer periphery of the intermediate rotating body 22 such that both central axes substantially coincide. The third worm wheel 32 engages with the third worm gear 30 and rotates according to the rotation of the third worm gear 30. The third worm wheel 32 is provided on the outer periphery of the connecting rotating body 33 such that both central axes substantially coincide. The axial angle between the third worm wheel 32 and the third worm gear 30 is set to 90°. The rotational axis line of the third worm wheel 32 is provided parallel to the rotational axis line of the first worm gear 10.

The driving gear 34 is affixed to the outer periphery of the connecting rotating body 33 such that both central axes substantially coincide with the third worm wheel 32. The driving gear 34 rotates as one according to the rotation of the third worm wheel 32. The driven gear 36 engages with the driving gear 34 and rotates according to the rotation of the driving gear 34. The third rotating body 38 is affixed to the driven gear 36 such that both central axes substantially coincide. The third rotating body 38 rotates according to the rotation of the driven gear 36. The rotational axis line of the third rotating body 38 is provided parallel to the rotational axis line of the first rotating body 20.

The third worm gear 30 has 1 thread, and the third worm wheel 32 has 30 teeth. In other words, the third worm gear 30 and the third worm wheel 32 form a third worm transmission mechanism 31 having a 1/30 reduction ratio. When the third worm gear 30 completes 30 revolutions as one with the intermediate rotating body 22, the third worm wheel 32 completes 1 revolution. In other words, when the main shaft 1a completes 600 revolutions, the third worm wheel 32 completes 1 revolution. The driving gear 34 is a spur gear with 24 teeth, and the driven gear 36 is a spur gear with 40 teeth. The driving gear 34 and the driven gear 36 form a reduction mechanism 35 having a 3/5 reduction ratio. In other words, when the first rotating body 20 completes 1,000 revolutions, the driven gear 36, the third rotating body 38, and the magnet Mh complete 1 revolution as one.

When the first rotating body 20 completes 1,000 revolutions, the third rotating body 38, the driven gear 36, and the magnet Mh complete 1 revolution. When the first rotating body 20 rotates 360° (1 revolution), the third rotating body 38 and the magnet Mh rotate 0.36°. The angle sensor Ah can specify 1 revolution of the first rotating body 20 every 0.36°, and can specify the rotation amount for 1,000 revolutions of the first rotating body 20.

The third rotating body 38 rotates at a second reduction ratio K2=1/10 with respect to the rotation of the second rotating body 24. When the second rotating body 24 rotates 360° (1 revolution), the third rotating body 38 and the magnet Mh rotate 36°. The angle sensor Ah can specify 1 revolution of the second rotating body 24 every 36°.

Next, a detailed configuration of the angle detection apparatus 200 according to the second embodiment will be described. The angle detection apparatus 200 additionally includes the housing 3, the lid 4, a base 2, the substrate 5, a biasing part 62, and a plurality of fixtures 64. The biasing part 62 will be described later.

There are no special limitations on the shape of the angle detection apparatus 200, but in this example, the angle detection apparatus 200 is substantially rectangular from a plan view, and has a thin, elongated rectangular shape in the extension direction of the main shaft (hereinafter referred to as the axial direction; in this example, the axial direction is the direction parallel to the Z-axis direction) from a front view and a side view. In other words, the angle detection apparatus 200 has a flat rectangular cuboid shape in the Z-axis direction.

The housing 3 is a hollow rectangular tubular member that houses the internal structure of the angle detection apparatus 200. The housing 3 at least includes a plurality of (for example, four) outer walls 3b, 3c, 3d, and 3e that surround the main shaft 1a and the intermediate rotating body 22. The outer walls 3b, 3c, 3d, and 3e are joined to each other in the above order. The outer walls 3b and 3d are provided parallel to each other. The outer walls 3c and 3e bridge the lateral edges of the outer walls 3b and 3d, and are provided parallel to each other. In this example, the outer walls 3b and 3d extend in the X-axis direction in a plan view, while the outer walls 3c and 3e extend in the Y-axis direction in a plan view. The housing 3 is affixed to a floor 2b of the base 2 described later by a plurality of (for example, three) fixtures 64.

The lid 4 is a tabular member that is substantially rectangular from a plan view and thin in the axial direction. The lid 4 is affixed to the edges of the outer walls 3b, 3c, 3d, and 3e of the housing 3.

The base 2 is a platform that rotatably supports the rotating bodies and the gears. Pillars 2c disposed on the base 2 support the substrate 5. The base 2 includes the floor 2b and a plurality of (for example, four) pillars 2c. The floor 2b is a tabular portion facing the motor 1 side of the angle detection apparatus 200, and extends in the X-axis and Y-axis directions. The pillars 2c are substantially columnar portions that project up from the floor 2b in the axial direction and in the direction going away from the motor 1.

The substrate 5 is a tabular printed board that is substantially rectangular from a plan view and thin in the axial direction. The substrate 5 mainly supports the angle sensors Am, As, and Ah as well as the processor 40. The substrate 5 is affixed to the projecting ends of the pillars 2c using screws (not illustrated) for example. The fixtures 64 may also be screws, for example.

(First Rotating Body)

The first rotating body 20 rotates according to the rotation of the main shaft 1a, and imparts the rotation of the main shaft 1a to the first worm gear 10. The first rotating body 20 includes a joining part 20b that fits onto the outer periphery of the main shaft 1a, a gear-forming part 20c where the first worm gear 10 is formed, and a holding part 20d that holds the magnet Ms. The joining part 20b has a cylindrical shape that surrounds the main shaft 1a. The gear-forming part 20c has a disc shape extending radially from the outer periphery of the joining part 20b. The holding part 20d has a cylindrical concave shape provided on the end face distant from the floor 2b in the axial direction of the gear-forming part 20c. The joining part 20b, the gear-forming part 20c, and the holding part 20d are formed as one such that the respective central axes substantially coincide. The first rotating body 20 can be formed from any of various materials such as resin materials and metal materials. In this example, the first rotating body 20 is formed from polyacetal resin.

(First Worm Gear)

The first worm gear 10 is a transmission element that drives the first worm wheel 12. Particularly, the first worm gear 10 is a screw gear with 1 thread formed on the outer periphery of the gear-forming part 20c. The rotational axis line of the first worm gear 10 extends in the axial direction of the main shaft 1a.

(Intermediate Rotating Body)

The intermediate rotating body 22 rotates according to the rotation of the main shaft 1a, and imparts the rotation of the main shaft 1a to the second rotating body 24 and the connecting rotating body 33. The intermediate rotating body 22 is supported to allow rotation about a rotational axis line La extending substantially parallel to the floor 2b. The intermediate rotating body 22 is a substantially cylindrical member that extends in the direction of the rotational axis line La. The intermediate rotating body 22 includes a base part 22b, a first tube part 22c where the first worm wheel 12 is formed, a second tube part 22d where the second worm gear 14 is formed, a third tube part 22e where the third worm gear 30 is formed, and supported parts 22f and 22g provided on either end.

The intermediate rotating body 22 is disposed at a predetermined position with respect to the outer walls 3b and 3d of the housing 3. The outer wall 3b is disposed on the side opposite the main shaft 1a of the intermediate rotating body 22. The outer wall 3d is disposed on the side where the main shaft 1a is disposed of the intermediate rotating body 22, parallel to the outer wall 3b. The intermediate rotating body 22 may also be disposed such that the rotational axis line La points in any direction. The rotational axis line La of the intermediate rotating body 22 may also be provided inclined in a range from 5° to 30° with respect to the extension direction of the outer wall 3b provided on the side opposite the main shaft 1a of the intermediate rotating body 22 in a plan view. In the example of FIG. 12, the rotational axis line La of the intermediate rotating body 22 is inclined 20° with respect to the extension direction of the outer wall 3b. In other words, the housing 3 includes the outer wall 3b extending in a direction inclined in a range from 5° to 30° with respect to the rotational axis line La of the intermediate rotating body 22 in a plan view. In the example of FIG. 12, an inclination Es between the extension direction of the outer wall 3b and the rotational axis line La of the intermediate rotating body 22 is set to 20°.

In the example of FIG. 12, the base part 22b has a cylindrical shape, while the first tube part 22c, the second tube part 22d, and the third tube part 22e have cylindrical shapes of larger diameter than the base part 22b. The base part 22b, the first tube part 22c, the second tube part 22d, the third tube part 22e, and the supported parts 22f and 22g are formed as one such that the respective central axes substantially coincide. The second tube part 22d, the first tube part 22c, and the third tube part 22e are disposed at positions separated from each other in the above order. The intermediate rotating body 22 can be formed from any of various materials such as resin materials and metal materials. In this example, the intermediate rotating body 22 is formed from polyacetal resin.

In the example of FIG. 12, the supported parts 22f and 22g are supported by supporting parts 2f and 2g formed by cutting and raising portions of the floor 2b. The supporting parts 2f and 2g are provided with holes into which the supported parts 22f and 22g are fitted, penetrating in the rotational axis line direction of the intermediate rotating body 22. By configuring the parts in this way, the intermediate rotating body 22 is rotatably supported by the supporting parts 2f and 2g.

(Biasing Part)

The biasing part 62 is an element that suppresses positional fluctuations of the intermediate rotating body 22 arising from the reaction force when the worm gears drive the worm wheels. The biasing part 62 includes an attaching part 62b attached to the floor 2b, and a spring part 62c that extends from the attaching part 62b to contact a hemispherical projection 22h of the intermediate rotating body 22. The attaching part 62b and the spring part 62c are formed from a laminar spring material, and the root of the spring part 62c is bent partway at a substantially right angle to the attaching part 62b. Through the biasing force of the biasing part 62, fluctuations in the position in the rotational axis direction of the intermediate rotating body 22 can be suppressed. The reaction forces exerted by the second worm gear 14 and the third worm gear 30 on the intermediate rotating body 22 are set in opposite directions.

(First Worm Wheel)

The first worm wheel 12 is a transmission element driven by the first worm gear 10. Particularly, the first worm wheel 12 is a helical gear with 20 teeth formed on the outer periphery of the first tube part 22c. The first worm gear 10 and the first worm wheel 12 form the first worm transmission mechanism 11. The rotational axis line of the first worm wheel 12 extends in a direction perpendicular to the axial direction of the main shaft 1a.

(Second Worm Gear)

The second worm gear 14 is a transmission element that drives the second worm wheel 16. Particularly, the second worm gear 14 is a screw gear with five threads formed on the outer periphery of the second tube part 22d. The rotational axis line of the second worm gear 14 extends in a direction perpendicular to the axial direction of the main shaft 1a.

(Second Rotating Body)

The second rotating body 24 rotates according to the rotation of the main shaft 1a, and imparts the rotation of the main shaft 1a at a reduced speed to the magnet Mm. The second rotating body 24 is supported to allow rotation about a rotational axis line extending substantially perpendicular from the floor 2b. The second rotating body 24 is a substantially circular member from a plan view. The second rotating body 24 includes a bearing part 24b rotatably supported on the floor 2b, an overhanging part 24c where the second worm wheel 16 is formed, and a holding part 24d that holds the magnet Mm. The bearing part 24b has a cylindrical shape that surrounds, with a gap, a shaft 24s that projects up from the floor 2b.

The overhanging part 24c has a disc shape that overhangs in the radial direction from the outer periphery of the bearing part 24b. In this example, the overhanging part 24c is provided at a position closer to the farther end of the bearing part 24b away from the floor 2b. The holding part 24d has a cylindrical concave shape provided on the end face distant from the floor 2b in the axial direction of the overhanging part 24c. The bearing part 24b, the overhanging part 24c, and the holding part 24d are formed as one such that the respective central axes substantially coincide. The second rotating body 24 can be formed from any of various materials such as resin materials and metal materials. In this example, the second rotating body 24 is formed from polyacetal resin.

(Second Worm Wheel)

The second worm wheel 16 is a helical gear driven by the second worm gear 14. Particularly, the second worm wheel 16 is a helical gear with 25 teeth formed on the outer periphery of the overhanging part 24c. The second worm gear 14 and the second worm wheel 16 form the second worm transmission mechanism 15. The rotational axis line of the second worm wheel 16 extends in a direction parallel to the axial direction of the main shaft 1a.

The third worm gear 30 is a transmission element that drives the third worm wheel 32. Particularly, the third worm gear 30 is a screw gear with 1 thread formed on the outer periphery of the third tube part 22e. The rotational axis line of the third worm gear 30 extends in a direction perpendicular to the axial direction of the main shaft 1a.

(Connecting Rotating Body)

The connecting rotating body 33 rotates according to the rotation of the main shaft 1a, and imparts the rotation of the main shaft 1a to the third rotating body 38 at a reduced speed. The connecting rotating body 33 is supported to allow rotation about a rotational axis line extending substantially perpendicular from the floor 2b. The connecting rotating body 33 is a substantially circular member from a plan view. The connecting rotating body 33 includes a bearing part 33b rotatably supported on the floor 2b, and an overhanging part 33c where the third worm wheel 32 is formed. The bearing part 33b has a cylindrical shape that surrounds, with a gap, a shaft 33s that projects up from the floor 2b.

By providing the connecting rotating body 33, the third rotating body 38 described later can be disposed at a position distanced from the third worm gear 30 by a corresponding amount. For this reason, the distance between the magnets Ms and Mh can be lengthened to reduce the influence of leakage flux with each other. Also, by providing the connecting rotating body 33, the range in which the reduction ratio can be set is correspondingly expanded, and the degree of freedom in design is improved.

The overhanging part 33c has a disc shape that overhangs in the radial direction from the outer periphery of the bearing part 33b. In this example, the overhanging part 33c is provided at a position closer to the farther end of the bearing part 33b away from the floor 2b. The driving gear 34 is formed on the outer periphery of the region of the bearing part 33b closer to the floor 2b than the overhanging part 33c.

The bearing part 33b and the overhanging part 33c are formed as one such that the respective central axes substantially coincide. The connecting rotating body 33 can be formed from any of various materials such as resin materials and metal materials. In this example, the connecting rotating body 33 is formed from polyacetal resin.

(Third Worm Wheel)

The third worm wheel 32 is a transmission element driven by the third worm gear 30. Particularly, the third worm wheel 32 is a helical gear with 30 teeth formed on the outer periphery of the overhanging part 33c. The third worm gear 30 and the third worm wheel 32 form the third worm transmission mechanism 31. The rotational axis line of the third worm wheel 32 extends in a direction parallel to the axial direction of the main shaft 1a.

(Driving Gear)

The driving gear 34 is a transmission element that drives the driven gear 36. Particularly, the driving gear 34 is a spur gear with 24 teeth formed on the outer periphery of the bearing part 33b.

(Third Rotating Body)

The third rotating body 38 rotates according to the rotation of the main shaft 1a, and imparts the rotation of the main shaft 1a at a reduced speed to the magnet Mh. The third rotating body 38 is supported to allow rotation about a rotational axis line extending substantially perpendicular from the floor 2b. The third rotating body 38 is a substantially circular member from a plan view. The third rotating body 38 includes a bearing part 38b rotatably supported on the floor 2b, an overhanging part 38c where the driven gear 36 is formed, and a holding part 38d that holds the magnet Mh. The bearing part 38b has a cylindrical shape that surrounds, with a gap, a shaft 38s that projects up from the floor 2b.

The overhanging part 38c has a disc shape that overhangs in the radial direction from the outer periphery of the bearing part 38b. In this example, the overhanging part 38c is provided at a position closer to the floor 2b on the bearing part 38b. The holding part 38d has a cylindrical concave shape provided on the end face distant from the floor 2b in the axial direction of the bearing part 38b. The bearing part 38b, the overhanging part 38c, and the holding part 38d are formed as one such that the respective central axes substantially coincide. The third rotating body 38 can be formed from any of various materials such as resin materials and metal materials. In this example, the third rotating body 38 is formed from polyacetal resin.

(Driven Gear)

The driven gear 36 is a transmission mechanism driven by the driving gear 34. Particularly, the driven gear 36 is a spur gear with 60 teeth formed on the outer periphery of the overhanging part 38c. The driving gear 34 and the driven gear 36 form the reduction mechanism 35.

The magnet Ms is glued to the holding part 20d of the first rotating body 20, the magnet Mm is glued to the holding part 24d of the second rotating body 24, and the magnet Mh is glued to the holding part 38d of the third rotating body 38.

(Operation)

Figure 16:
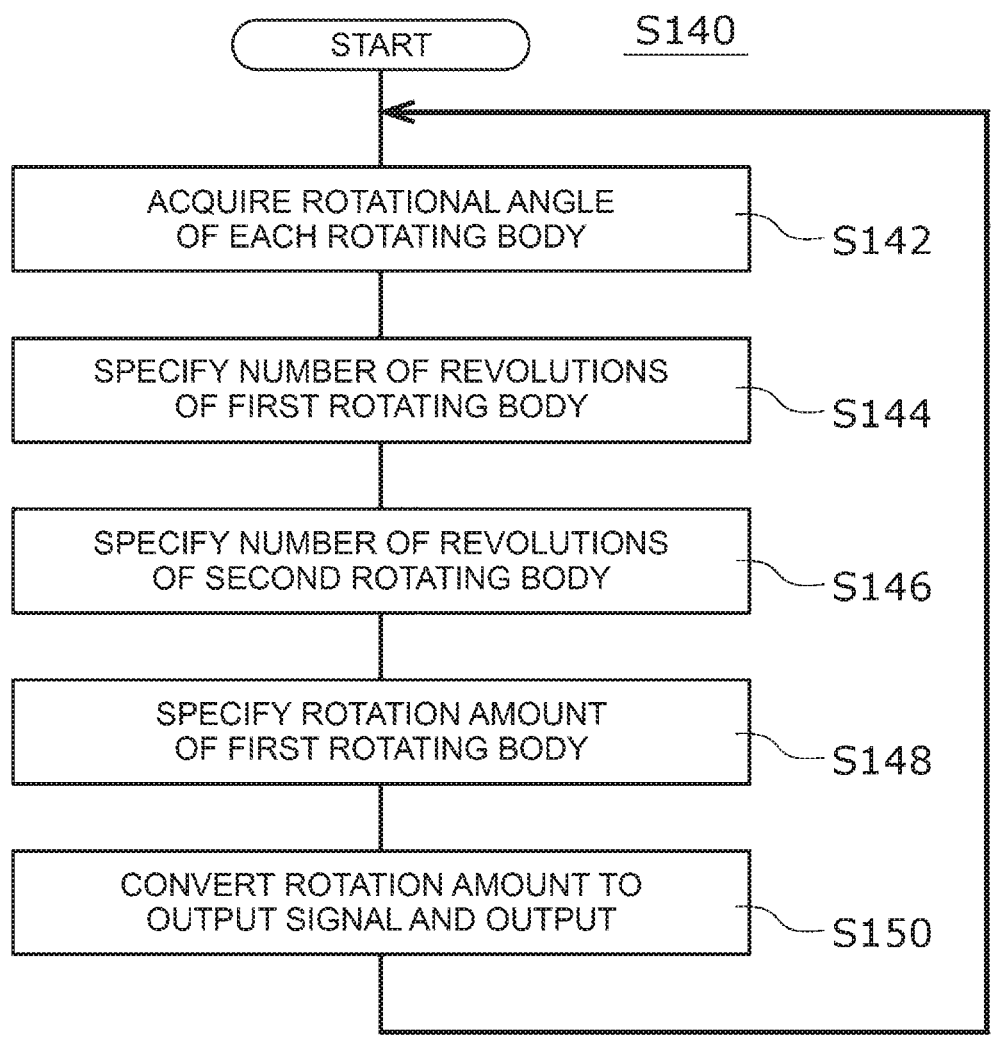
FIG. 16 A flowchart illustrating an example of operation by the angle detection apparatus of FIG. 6.

Next, the operation of the angle detection apparatus 200 according to the second embodiment configured in this way will be described. FIG. 16 is a flowchart illustrating an example of operation by the angle detection apparatus 200. FIG. 16 illustrates a process S140 by which the rotation amount of the first rotating body 20 is specified and output as the output signal 40a. When the process S140 is started, the rotational angle acquisition modules 40s, 40m, and 40h acquire the detection results from the angle sensors As, Am, and Ah, namely the rotational angles θso, θmo, and θho of the rotating bodies, as the rotational angles θs, θm, and θh (step S142).

When the rotational angles are acquired, the first number of revolutions specification module 40p performs the first number of revolutions specification process that specifies the number of revolutions Rs of the first rotating body 20 according to the rotational angles θs and θm (step S144). Similarly, the second number of revolutions specification module 40q performs a second number of revolutions specification process that specifies the number of revolutions Rm of the second rotating body 24 according to the rotational angles θm and θh (step S146).

The first number of revolutions specification process described in the first embodiment, namely the process S100, can be applied to the process of step S144. The second number of revolutions specification process described in the first embodiment, namely the process S120, can be applied to the process of step S146. In the case of applying these processes, the first rotating body 120 is substituted by the first rotating body 20, the second rotating body 122 by the second rotating body 24, the third rotating body 124 by the third rotating body 38, the first reduction ratio G1 (1/60) by the first reduction ratio K1 (1/100), and the second reduction ratio G2 (1/12) by the second reduction ratio K2 (1/10).

When the numbers of revolutions are specified, the rotation amount specification module 40e specifies the rotation amount θa over multiple revolutions of the first rotating body 20 according to the specified numbers of revolutions Rs and Rm and the rotational angle θs (step S148). The rotation amount θa can be specified according to Formula 14 by substituting the first reduction ratio G1 (1/60) with the first reduction ratio K1 (1/100). Note that in the example of FIG. 6, the rotation amount θa of the first rotating body 20 is the rotation amount of the main shaft 1a of the motor 1. When the rotation amount is specified, the output module 40d converts and outputs the specified rotation amount θa as the output signal 40a in a desired format (step S150). In the example of FIG. 6, the output signal 40a is output via the connector 5c provided on the substrate 5.

When step S150 is executed, the processor 40 returns the process to the beginning of step S142, and repeats steps S142 to S150. Note that the process S140 is merely an example, and it is also possible to add other steps, remove some of the steps, or change the order of the steps.

The angle detection apparatus 200 according to the second embodiment configured in this way exhibits effects and advantages similar to the first embodiment. Furthermore, the angle detection apparatus 200 exhibits the following effects and advantages.

In the angle detection apparatus 200 according to the second embodiment, the transmission mechanism 18 includes the intermediate rotating body 22 that transmits the rotation of the first rotating body 20 to the second rotating body 24, and the rotational axis line of the intermediate rotating body 22 is provided at a position twisted with respect to the rotational axis line of the first rotating body 20. According to this configuration, the reduction ratio can be increased by coupling a plurality of transmission mechanisms with the intermediate rotating body 22 in between, and therefore the specification range of the number of revolutions can be expanded compared to the case in which an intermediate rotating body is not included. In the angle detection apparatus 200, by disposing the rotational axis lines at twisted positions, the transmission pathway of the transmission mechanism 18 can be bent, and therefore the transmission mechanism 18 can be made thinner compared to the case in which the transmission pathway is not bent. Also, in the angle detection apparatus 200, because the number of revolutions is specified while dynamically varying the specification condition, the alignment of the rotating bodies is easy even if the reduction ratio is large, and the labor of manufacturing can be reduced.

In the angle detection apparatus 200 according to the second embodiment, the transmission mechanism 18 includes the first worm gear 10 that transmits the rotation of the first rotating body 20 to the second rotating body 24, and the first worm wheel 12 that engages with the first worm gear 10. According to this configuration, by including the worm gear and the worm wheel, the reduction ratio of the transmission mechanism 18 can be increased, and therefore the specification range of the number of revolutions can be expanded. In the angle detection apparatus 200, because the inclusion of the worm gear and the worm wheel makes it possible to bend the transmission pathway of the transmission mechanism 18, the transmission mechanism 18 can be made thinner compared to the case in which the transmission pathway is not bent. Also, in the angle detection apparatus 200, because the number of revolutions is specified while dynamically varying the specification condition, the alignment of the rotating bodies is easy even if the reduction ratio is large, and the labor of manufacturing can be reduced.

Third Embodiment

Figure 17:
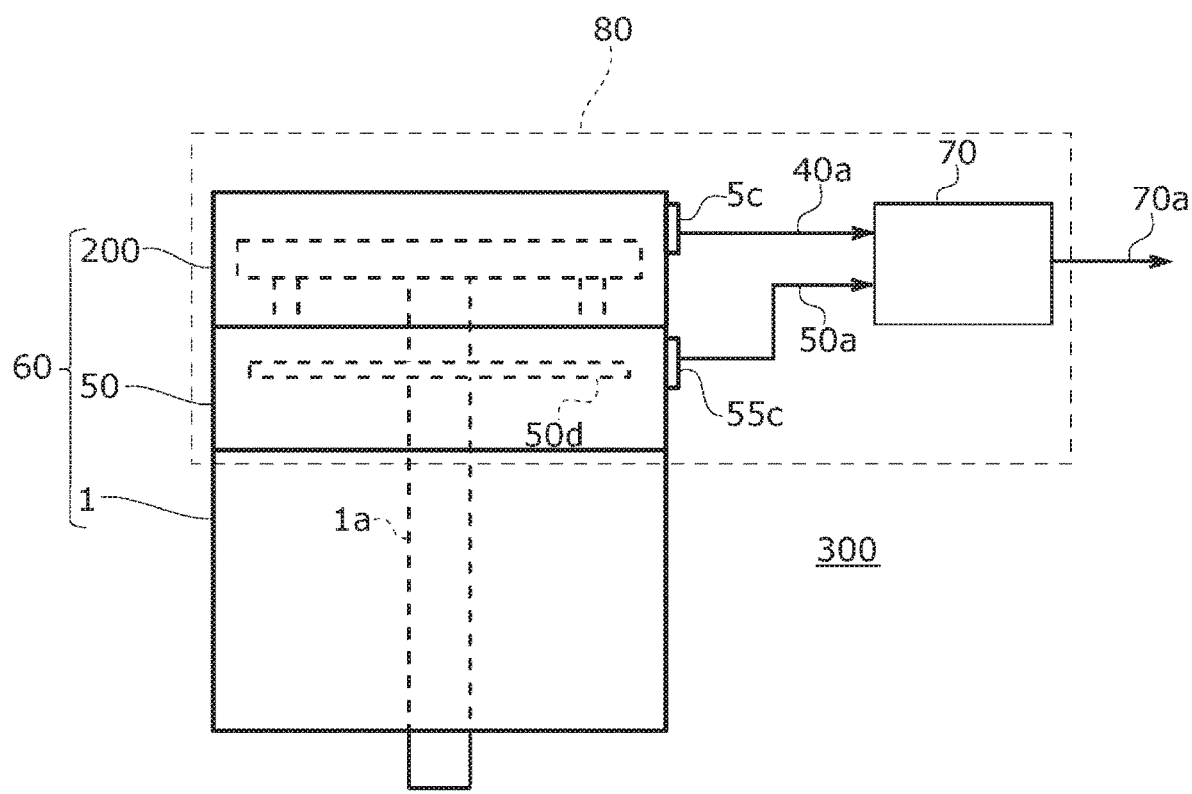
FIG. 17 A block diagram illustrating an example of a configuration of an angle driving unit according to a third embodiment of the present invention.

Next, a third embodiment of the present invention will be described. FIG. 17 is a block diagram illustrating an example of the configuration of a rotary driving unit 300 according to the third embodiment. First, the circumstances that led to the conception of the rotary driving unit 300 will be described. In the description of the second embodiment, an example is described in which the angle detection apparatus 200 is used as a standalone absolute encoder that specifies the rotation amount $\theta a$ over multiple revolutions of the first rotating body 20. For an absolute encoder, it is desirable to adopt a CPU with a low processing speed from the perspective of cost savings. If a low-speed CPU is used, there is a possibility that processing will not keep up during high-speed rotation. On the other hand, it is difficult for an incremental encoder to detect the absolute rotational position when restarting operation after power is interrupted.

Accordingly, the inventors devised a configuration that combines an incremental encoder with an absolute encoder. In particular, by combining an incremental encoder, namely the rotation detection apparatus 50, with the angle detection apparatus 200, it is possible to provide a rotation amount specification unit with excellent high-speed response capable of detecting the rotation amount when restarting operation after stopping. A rotation amount specification unit 80 illustrated in FIG. 17 includes the angle detection apparatus 200, the rotation detection apparatus 50, and a rotation amount specification apparatus 70. The rotation amount specification apparatus 70 specifies the absolute rotation amount of the first rotating body 20 according to the output of the angle detection apparatus 200 and the output of the rotation detection apparatus 50. Note that the rotation amount specified by the rotation amount specification unit 80 is designated the absolute rotation amount, in distinction from the rotation amount specified by the angle detection apparatus 200.

When the motor is attached to the rotation amount specification unit 80, it is desirable for both central axes to coincide as much as possible. Accordingly, the inventors devised the integrated rotary driving unit 300 that combines the motor 1 with the rotation amount specification unit 80. Hereinafter, the rotary driving unit 300 will be described specifically.

The rotary driving unit 300 includes the angle detection apparatus 200, the rotation detection apparatus 50, the rotation amount specification apparatus 70, and the motor 1. The rotary driving unit 300 specifies and outputs the absolute rotation amount of the main shaft 1a of the motor 1. The angle detection apparatus 200 is the same as the one described in the second embodiment. The rotation detection apparatus 50 is a rotation detection apparatus that outputs a pulse sequence 50a having a number of pulses corresponding to the rotation amount of a rotating body, namely the main shaft 1a. The rotation detection apparatus 50 is not particularly limited insofar as the rotation detection apparatus 50 is capable of outputting the pulse sequence 50a having a number of pulses corresponding to the rotation amount. In this example, the rotation detection apparatus 50 is an optical incremental rotary encoder that optically detects slits in a code wheel 50d. The rotation detection apparatus 50 outputs the pulse sequence 50a to a connector 55c.

The rotation detection apparatus 50 features high resolution and fast response because an arithmetic process is not used. In this example, the angle detection apparatus 200 is provided on an end in the Z-axis direction of the motor 1, and the rotation detection apparatus 50 is provided between the motor 1 and the angle detection apparatus 200.

In the rotary driving unit 300, the main shaft 1a rotates as one with the first rotating body 20, and therefore the rotation detection apparatus 50 outputs the pulse sequence 50a having a number of pulses corresponding to the rotation amount of the first rotating body 20. The number of pulses in the pulse sequence 50a is proportional to the rotation amount of the first rotating body 20. The change in the rotation amount of the first rotating body 20 (hereinafter referred to as the change M) is specified by multiplying a count value of the number of pulses in the pulse sequence 50a by a proportionality constant T. The proportionality constant T is defined as a rotation amount per a number of pulses. As an example, the proportionality constant T may be the slit pitch, which is a value obtained by dividing the rotation amount of one revolution, that is, 360°, by the number of slits in the code wheel 50d.

A motor based on known principles can be adopted as the motor 1. The motor 1 in this example is a hybrid stepping motor. A hybrid stepping motor is preferable because a large torque and a high resolution can be achieved.

The rotation amount specification apparatus 70 specifies the absolute rotation amount of the first rotating body 20 according to the output signal 40a output from the angle detection apparatus 200 and the pulse sequence 50a output from the rotation detection apparatus 50. In particular, the rotation amount specification apparatus 70 acquires the rotation amount $\theta a$ of the first rotating body 20 from the output signal 40a and stores the rotation amount (hereinafter, the stored rotation amount is referred to as the stored rotation amount $\theta m$), counts the number of pulses in the pulse sequence 50a and multiplies the obtained count value by the proportionality constant T to specify the change $\Delta\theta$ of the rotation amount, and adds the change $\Delta\theta$ in the rotation amount since the timing when the rotation amount was stored to the stored rotation amount $\theta m$ to specify and output an absolute rotation amount 70a of the first rotating body 20.

The storage timing when the rotation amount $\theta a$ is stored can be set depending on the desired characteristics. For example, the storage timing may be when operation is restarted after power is stopped, or when the rotational speed of the first rotating body 20 exceeds a preset threshold. The rotation amount specification apparatus 70 is configured to store the rotation amount θa at the timing when operation is restarted after power is stopped. The stored rotation amount θm may be updated continuously or updated at preset timings.

The rotary driving unit 300 according to the third embodiment includes the rotation amount specification unit 80 and the motor 1, the motor 1 being a hybrid stepping motor that includes the main shaft 1a and rotationally drives the main shaft 1a. The first rotating body 20 is configured to rotate as one with the main shaft 1a. According to this configuration, the absolute rotation amount 70a can be specified in correspondence with high-speed rotation, even in the case of using a CPU with a low processing speed in the processor 40 of the angle detection apparatus 200.

Selective combinations of the embodiments and variants described above are also useful as embodiments of the present invention. New embodiments produced by such combinations have the combined effects of each of the combined embodiments and variants.

LIST OF REFERENCE SIGNS

1 motor,
1a main shaft,
5 substrate,
10 first worm gear,
11 first worm transmission mechanism,
12 first worm wheel,
14 second worm gear,
15 second worm transmission mechanism,
16 second worm wheel,
18 transmission mechanism,
20 first rotating body,
22 intermediate rotating body,
24 second rotating body,
30 third worm gear,
31 third worm transmission mechanism,
32 third worm wheel,
33 connecting rotating body,
34 driving gear,
35 reduction mechanism,
36 driven gear,
38 third rotating body,
40 processor,
50 rotation detection apparatus,
60 motor unit,
70 rotation amount specification apparatus,
80 rotation amount specification unit,
100 angle detection apparatus,
200 angle detection apparatus,
300 rotary driving unit

The invention claimed is:

1. An angle detection apparatus comprising:
a rotating body;
another rotating body;
a transmission mechanism that causes the other rotating body to rotate by reducing a speed of a rotation of the rotating body;
an angle detector that detects a rotational angle of the rotating body;
another angle detector that detects a rotational angle of the other rotating body; and
a processor that specifies a number of revolutions of the rotating body, wherein
the processor specifies the number of revolutions while dynamically varying a specification condition for specifying the number of revolutions according to a numerical value decided according to the detected rotational angle of the rotating body and a reduction ratio of the transmission mechanism, and the detected rotational angle of the other rotating body,
wherein
the processor performs
a shift process of shifting the specification condition for specifying the number of revolutions by a predetermined shift quantity at a time,
a determination process of determining whether or not a detection result from the other angle detector satisfies a specification condition shifted by the shift process,
an update process of repeating the shift process and the determination process while also updating a loop counter value until a predetermined condition is satisfied, and
a process of specifying the number of revolutions according to the loop counter value when the detection result from the other angle detector has satisfied the specification condition shifted by the shift process.

2. The angle detection apparatus according to claim 1, wherein
the transmission mechanism includes an intermediate rotating body that transmits the rotation of the rotating body to the other rotating body, and
a rotational axis line of the intermediate rotating body is provided at a position twisted with respect to a rotational axis line of the rotating body.

3. The angle detection apparatus according to claim 1, wherein
the transmission mechanism includes a worm gear that transmits the rotation of the rotating body to the other rotating body, and a worm wheel that engages with the worm gear.

4. A rotation amount specification unit comprising:
the angle detection apparatus according to claim 1;
a rotation detection apparatus that outputs a pulse sequence having a number of pulses corresponding to a rotation amount of the rotating body; and
a rotation amount specification apparatus that specifies an absolute rotation amount of the rotating body, wherein
the angle detection apparatus specifies the rotation amount of the rotating body according to the specified number of revolutions, the detected rotational angle of the rotating body, and the detected rotational angle of the other rotating body, and
the rotation amount specification apparatus acquires and stores the rotation amount of the rotating body specified by the angle detection apparatus as a stored rotation amount, and specifies the absolute rotation amount according to the stored rotation amount and a numerical value obtained by counting the number of pulses in the pulse sequence.

5. A rotary driving unit comprising:
the rotation amount specification apparatus according to claim 4; and
a hybrid stepping motor that includes a main shaft and rotationally drives the main shaft, wherein
the rotating body is configured to rotate as one with the main shaft.

* * * * *